(12) United States Patent
Nassi

(10) Patent No.: US 10,205,772 B2
(45) Date of Patent: Feb. 12, 2019

(54) SAVING AND RESUMING CONTINUATION ON A PHYSICAL PROCESSOR AFTER VIRTUAL PROCESSOR STALLS

(71) Applicant: TidalScale, Inc., Campbell, CA (US)

(72) Inventor: Isaac R. Nassi, Los Gatos, CA (US)

(73) Assignee: TidalScale, Inc., Campbell, CA (US)

( * ) Notice: Subject to any disclaimer, the term of this patent is extended or adjusted under 35 U.S.C. 154(b) by 0 days.

(21) Appl. No.: 15/429,638

(22) Filed: Feb. 10, 2017

(65) Prior Publication Data

US 2017/0279872 A1    Sep. 28, 2017

Related U.S. Application Data

(63) Continuation of application No. 14/880,132, filed on Oct. 9, 2015, now Pat. No. 9,609,048, which is a continuation of application No. 13/830,094, filed on Mar. 14, 2013, now Pat. No. 9,191,435.

(60) Provisional application No. 61/692,648, filed on Aug. 23, 2012.

(51) Int. Cl.
*G06F 9/48* (2006.01)
*H04L 29/08* (2006.01)
*G06F 9/455* (2018.01)
*G06F 9/50* (2006.01)

(52) U.S. Cl.
CPC .............. *H04L 67/10* (2013.01); *G06F 9/455* (2013.01); *G06F 9/5077* (2013.01); *G06F 9/4856* (2013.01); *G06F 9/5011* (2013.01); *G06F 2009/45583* (2013.01)

(58) Field of Classification Search
CPC ...... G06F 9/455; G06F 9/5077; G06F 9/4856; G06F 2009/45583; G06F 9/5011; H04L 67/10
See application file for complete search history.

(56) References Cited

U.S. PATENT DOCUMENTS

| | | |
|---|---|---|
| 5,109,486 A | 4/1992 | Seymour |
| 5,745,778 A | 4/1998 | Alfieri |
| 5,991,893 A | 11/1999 | Snider |
| 6,016,542 A | 1/2000 | Gottlieb |

(Continued)

FOREIGN PATENT DOCUMENTS

GB    2419701    5/2006

OTHER PUBLICATIONS

PCT2013/058271, "Notification of Transmittal of the International Search Report and the Written Opinion of the International Searching Authority, or Declaration", dated Mar. 18, 2014.

(Continued)

*Primary Examiner* — Benjamin C Wu
(74) *Attorney, Agent, or Firm* — Van Pelt, Yi & James LLP

(57) ABSTRACT

Selective resource migration is disclosed. A computer system includes physical memory and a plurality of physical processors. Each of the processors has one or more cores and each core instantiates one or more virtual processors that executes program code. Each core is configured to invoke a hyper-kernel on its hosting physical processor when the core cannot access a portion of the physical memory needed by the core. The hyper-kernel selectively moves the needed memory closer to a location accessible by the physical processor or remaps the virtual processor to another core.

40 Claims, 12 Drawing Sheets

(56) References Cited

U.S. PATENT DOCUMENTS

| | | | |
|---|---|---|---|
| 6,105,053 A | 8/2000 | Kimmel | |
| 6,601,083 B1 | 7/2003 | Reznak | |
| 6,625,709 B2 | 9/2003 | Aiken | |
| 6,658,447 B2 | 12/2003 | Cota-Robles | |
| 6,807,616 B1 | 10/2004 | McGrath | |
| 6,823,472 B1 | 11/2004 | Dekoning | |
| 7,222,221 B1 | 5/2007 | Agesen | |
| 7,308,498 B1 | 12/2007 | Olsen | |
| 7,328,371 B1 | 2/2008 | Kalyanasundharam | |
| 7,596,654 B1 | 9/2009 | Wong | |
| 7,613,882 B1 | 11/2009 | Akkawi | |
| 7,711,789 B1 | 5/2010 | Jnagal | |
| 7,715,400 B1 | 5/2010 | Krakirian | |
| 7,782,869 B1 | 8/2010 | Chitlur Srinivasa | |
| 7,783,788 B1 | 8/2010 | Quinn | |
| 7,797,375 B2 | 9/2010 | Vincent | |
| 7,802,073 B1 | 9/2010 | Cheng | |
| 7,844,709 B2 | 11/2010 | Aman | |
| 7,852,786 B2 | 12/2010 | Wang | |
| 8,346,909 B2 | 1/2013 | Dan | |
| 8,423,694 B2 | 4/2013 | Naylor | |
| 8,424,010 B2 | 4/2013 | Stegaru | |
| 8,544,004 B2 | 9/2013 | Fultheim | |
| 8,547,840 B1 * | 10/2013 | Kumar | H04L 43/0894 370/231 |
| RE44,610 E | 11/2013 | Krakirian | |
| 8,650,296 B1 | 2/2014 | Herington | |
| RE44,818 E | 3/2014 | Jnagal | |
| 8,693,391 B2 | 4/2014 | Garcia-Martin | |
| 8,776,050 B2 | 7/2014 | Plouffe | |
| 8,788,672 B2 | 7/2014 | Heller, Jr. | |
| 8,832,692 B2 | 9/2014 | Fultheim | |
| 9,020,801 B2 | 4/2015 | Fultheim | |
| 9,774,401 B1 | 9/2017 | Borrill | |
| 2002/0087611 A1 | 7/2002 | Tanaka | |
| 2003/0037185 A1 | 2/2003 | Davis | |
| 2004/0226026 A1 | 11/2004 | Glass | |
| 2004/0249947 A1 | 12/2004 | Novaes | |
| 2005/0044301 A1 | 2/2005 | Vasilevsky | |
| 2005/0223382 A1 | 10/2005 | Lippett | |
| 2006/0136653 A1 | 6/2006 | Traut | |
| 2006/0143350 A1 | 6/2006 | Miloushev | |
| 2006/0259818 A1 | 11/2006 | Howell | |
| 2007/0226795 A1 | 9/2007 | Conti | |
| 2007/0283125 A1 | 12/2007 | Manczak | |
| 2008/0028408 A1 | 1/2008 | Day | |
| 2008/0109876 A1 | 5/2008 | Hitomi | |
| 2008/0270659 A1 | 10/2008 | Grewal | |
| 2009/0064158 A1 | 3/2009 | Carter | |
| 2009/0138887 A1 | 5/2009 | Uehara | |
| 2009/0172690 A1 | 7/2009 | Zimmer | |
| 2009/0187904 A1 | 7/2009 | Serebrin | |
| 2009/0193122 A1 | 7/2009 | Krishamurthy | |
| 2009/0217276 A1 | 8/2009 | Brenner | |
| 2009/0288087 A1 | 11/2009 | Ringseth | |
| 2010/0031254 A1 | 2/2010 | Chin | |
| 2010/0235847 A1 | 9/2010 | Brehmer | |
| 2011/0004729 A1 | 1/2011 | Akkawi | |
| 2011/0004732 A1 | 1/2011 | Krakirian | |
| 2011/0004733 A1 | 1/2011 | Krakirian | |
| 2011/0010709 A1 | 1/2011 | Anand | |
| 2011/0041131 A1 | 2/2011 | Srivatsa | |
| 2011/0083134 A1 | 4/2011 | Song | |
| 2011/0087822 A1 | 4/2011 | Bennett | |
| 2011/0119422 A1 | 5/2011 | Grouzdev | |
| 2011/0179132 A1 | 7/2011 | Mayo | |
| 2011/0191783 A1 | 8/2011 | Le Moal | |
| 2011/0296406 A1 | 12/2011 | Bhandari | |
| 2012/0020370 A1 | 1/2012 | Sonnier | |
| 2012/0023311 A1 | 1/2012 | Yamamoto | |
| 2012/0079232 A1 | 3/2012 | Hinton | |
| 2012/0096462 A1 | 4/2012 | Kim | |
| 2012/0174097 A1 | 7/2012 | Levin | |
| 2012/0185866 A1 | 7/2012 | Couvee | |
| 2012/0297163 A1 | 11/2012 | Breternitz | |
| 2012/0303799 A1 | 11/2012 | Hadas | |
| 2013/0159997 A1 | 6/2013 | Cawlfield | |
| 2013/0167146 A1 | 6/2013 | Dong | |
| 2013/0173806 A1 | 7/2013 | Newton | |
| 2013/0263138 A1 | 10/2013 | Aho | |
| 2013/0332778 A1 * | 12/2013 | Spracklen | G06F 11/3409 714/47.1 |
| 2014/0059110 A1 | 2/2014 | Nassi | |
| 2014/0081918 A1 | 3/2014 | Srivas | |
| 2014/0201421 A1 | 7/2014 | Schoenberg | |
| 2014/0245294 A1 | 8/2014 | Kaul | |
| 2014/0245444 A1 | 8/2014 | Lutas | |
| 2015/0277908 A1 | 10/2015 | Bradbury | |
| 2016/0366183 A1 | 12/2016 | Smith | |
| 2018/0062764 A1 | 3/2018 | Borrill | |

OTHER PUBLICATIONS

PCT20131058262, "Notification of Transmittal of the International Search Report and the Written Opinion of the International Searching Authority, or Declaration", dated Mar. 25, 2014.

Aho et al. Principles of Optimal Page Replacement. Article in Journal of the ACM. vol. 18, No. 1, Jan. 1971.

Peter J. Denning. The Working Set Model for Program Behavior. Massachusetts Institute of Technology, Cambridge, Massachusetts. Communications of the ACM. vol. 11, No. 5. May 1968.

Author Unknown, Technical Summary, Kendall Square Research, 1992.

Bell et al., "DSM Perspective: Another Point of View", Proceedings of the IEEE, vol. 87, No. 3, Mar. 1999.

Bell et al., "The Encore Continuum: a complete distributed work station-multiprocessor computing environment", pp. 147, 149-155, 1985.

Dean et al., "MapReduce: Simplified Data Processing on Large Clusters", USENIX Association, OSDI '04: 6th Symposium on Operating Systems Design and Implementation, pp. 137-149, 2004.

Gordon Bell, "Scalable, Paralell Computers: Alternatives, Issues, and Challenges", from the International Journal of Parallel Programming, vol. 22, No. 1, 1994.

Mendel Rosenblum, "The Reincarnation of Virtual Machines", Jul./Aug. 2004.

Ousterhout et al., "The Case for RAMClouds: Scalable High-Performance Storage Entirely in DRAM" SIGOPS Operating Systems Review, vol. 43, No. 4, pp. 92-105, Dec. 2009.

Rajkumar Buyya, Architecture Alternatives for Scalable Single System Image Clusters, Proceedings of the 1999 Conference on High Performance Computing on Hewlett-Packard System.

Alnæs et al., "Scalable Coherent Interface", Jan. 1990.

Ami Litman, "The DUNIX Distributed Operating System", Jan. 1988.

Amza et al., "TreadMarks: Shared Memory Computing on Networks of Workstations", 1996.

Amza et al., "TreadMarks: Shared Memory Computing on Networks of Workstations", Feb. 1996.

Andrew W. Wilson Jr., "Hierarchical Cache / Bus Architecture for Shared Memory Multiprocessors", 1987.

Andrew Wilkins Wilson Jr., "Organization and Statistical Simulation of Hierarchical Multiprocessors", Department of Electrical and Computer Engineering, Carnegie-Mellon University, Aug. 1985. (part 1 of 4).

Andrew Wilkins Wilson Jr., "Organization and Statistical Simulation of Hierarchical Multiprocessors", Department of Electrical and Computer Engineering, Carnegie-Mellon University, Aug. 1985. (part 2 of 4).

Andrew Wilkins Wilson Jr., "Organization and Statistical Simulation of Hierarchical Multiprocessors", Department of Electrical and Computer Engineering, Carnegie-Mellon University, Aug. 1985. (part 3 of 4).

Andrew Wilkins Wilson Jr., "Organization and Statistical Simulation of Hierarchical Multiprocessors", Department of Electrical and Computer Engineering, Carnegie-Mellon University, Aug. 1985. (part 4 of 4).

(56) References Cited

OTHER PUBLICATIONS

Aral et al. Process Control Structures for Multiprocessors. Encore Computer Corporation. IEEE, 1991.
Aral, Ziya et al. "Variable Weight Processes with Flexible Shared Resources • ," (1989).
Assaf Schuster, Resume, Jul. 2017.
Author Unknown, "A research and development strategy for high performance computing", Executive Office of the President, Office of Science and Technology Policy, Nov. 20, 1987.
Author Unknown, "IBM System/360 Model 67: Functional Characteristics", IBM Systems Reference Library, First Edition, 1967.
Author Unknown, "IBM Time Sharing System: Command System User's Guide", IBM Systems Reference Library, Aug. 1976. (part 1 of 3).
Author Unknown, "IBM Time Sharing System: Command System User's Guide", IBM Systems Reference Library, Aug. 1976. (part 2 of 3).
Author Unknown, "IBM Time Sharing System: Command System User's Guide", IBM Systems Reference Library, Aug. 1976. (part 3 of 3).
Author Unknown, "Multimax Technical Summary", Encore Computer Corporation, May 1985.
Author Unknown, "System/360 Model 67: Time Sharing System Preliminary Technical Summary", IBM Systems Reference Library, 1966.
Author Unknown. Features—multicians.org/features.html. Multics Software Features. Jul. 21, 2012.
Barak et al., "MOS: A Multicomputer Distributed Operating System", The Hebrew University of Jerusalem, Software—Practice and Experience, vol. 15(8), 725-737, Aug. 1985.
Beck et al. Harness: a next generation distributed virtual machine. Future Generation Computer Systems 15 (1999). pp. 571-582.
Bell et al., "The Encore Continuum: a complete distributed work station—multiprocessor computing environment", National Computer Conference, 1985.
Bendtsen et al. Experience With the KSR-1 Parallel Computer. Jul. 1996.
Bensoussan et al. The Multics Virtual Memory: Concepts and Design. Association for Computing Machinery, Inc., 1972.
Bilas et al., "Shared virtual memory clusters: bridging the cost-performance gap between SMPs and hardware DSM systems", Journal of Parallel and Distributed Computing, Oct. 19, 2001.
Blakeney et al. An Application-Oriented Multiprocessing System: II Design Characteristics of the 9020 System. IBM Systems Journal, vol. 6, No. 2. 1967, part 2.
Boykin et al. Programming under Mach. UNIX and Open Systems Series. pp. 63-97. Copyright (c) 1993 by Addison-Wesley Publishing Company, Inc. 1993.
Breit et al. Technical Applications on the KSR1: High Performance and Ease of Use. IEEE, 1993.
Bugnion et al., "Disco: Running Commodity Operating Systems on Scalable Multiprocessors", Computer Systems Laboratory, Stanford University, 1997.
Büttner et al., "Arts of Peace—A High-Performance Middleware Layer for Parallel Distributed Computing", Mar. 31, 1995.
Buyya et al., "Single System Image (SSI)", The International Journal of High Performance Computing Applications, vol. 15, No. 2, 2001.
Buzen et al., "The evolution of virtual machine architecture", Honeywell Information Systems, Inc. and Harvard University, National Computer Conference, 1973.
C. Gordon Bell, "Multis: A New Class of Multiprocessor Computers", Science, vol. 228, pp. 462-467, Apr. 26, 1985.
Carl J. Young. Extended Architecture and Hypervisor Performance. IBM VM/370 Development Group. Published in: Proceedings of the workshop on virtual computer systems. pp. 177-183 Cambridge, Massachusetts, USA—Mar. 26-27, 197. ACM New York, NY, USA © 1973.
Chapman et al., "vNUMA: A Virtual Shared-Memory Multiprocessor", 2009.
Chen et al., "When Virtual Is Better Than Real", 2001.
Chester Gordon Bell. Three Decades of Multiprocessors. Feb. 1991.
Chester Gordon Bell. Darpa Proposal: Encore Computer Corporation Research and Development in High Performance and Fail Soft Multiprocessors for Parallelism; and Systolic Array Processors for Signal Processing. Mar. 10, 1984.
Corbató et al., "Introduction and Overview of the Multics System", 1965.
Corbató et al., "Multics—The first seven years", Spring Joint Computer Conference, 1972.
Dave Taylor. Distributed Operating Systems—An Overview of Current Research. Jun. 13, 1998.
David B. Gustavson, "Applications for the Scalable Coherent Interface", Stanford Linear Accelerator Center, Apr. 1990.
David B. Gustavson. [RPRWG] Dave James. Jan. 18, 2008.
David J. Schanin. The Design and Development of a Very High Speed System Bus—The Encore Multimax Nanobus. IEEE, 1986.
Edmnd Burke. An Overview of System Software for the KSR1. Kendall Square Research Corporation, Waltham, MA. IEEE. 1993.
Einar Rustad, "numascale: NumaConnect", Sep. 2013.
Elizabeth Corcoran, "Strategic computing: a status report", Apr. 1987.
Frank et al. The KSR1: Bridging the Gap Between Shared Memory and MPPs. IEEE, 1993.
Fraser et al. 3Leaf Virtual Server Software Architecture. Copyright © 2004 3Leaf Networks.
Fu et al., "Distributed shared arrays: A distributed virtual machine with mobility support for reconfiguration", Wayne State University, Sep. 1, 2003.
Gabriel Southern. Analysis of SMP VM CPU Scheduling. George Mason University. 2008.
Gardner Hendrie, "Oral History of Gordon Bell", Computer History Museum, Jun. 23, 2005.
Gertner et al., "Symmetric Parallel Processing", 1990.
Ghormley et al., "GLUnix: a Global Layer Unix for a Network of Workstations", University of California at Berkeley, Aug. 14, 1997.
Giloi W.K., Hastedt C., Schoen F., Schroeder-Preikschat W. (1991) A distributed implementation of shared virtual memory with strong and weak coherence. In: Bode A. (eds) Distributed Memory Computing. EDMCC 1991. Lecture Notes in Computer Science, vol. 487. Springer, Berlin, Heidelberg.
Goodman et al. Scalability and Its Application to Multicube. Computer Sciences Technical Report #835. Mar. 1989.
Gordon Bell, "Scalable, Parallel Computers: Alternatives, Issues, and Challenges", International Journal of Parallel Programming, vol. 22, No. 1, 1994.
Govil et al., "Cellular Disco: resource management using virtual clusters on shared-memory multiprocessors", 17th ACM Symposium on Operating Systems Principles, Dec. 1999.
Gregory F. Pfister, "An Introduction to the InfiniBand Architecture", 2001.
Gregory F. Pfister. In Search of Clusters the Ongoing Battle in Lowly Parallel Computing. Chapters 6-7, 11, 12.11.4.2, 13. Second Edition. © 1998 Prentice Hall PTR. 1998 (part 1 of 3).
Gregory F. Pfister. In Search of Clusters the Ongoing Battle in Lowly Parallel Computing. Chapters 6-7, 11, 12.11.4.2, 13. Second Edition. © 1998 Prentice Hall PTR. 1998 (part 2 of 3).
Gregory F. Pfister. In Search of Clusters the Ongoing Battle in Lowly Parallel Computing. Chapters 6-7, 11, 12.11.4.2, 13. Second Edition. © 1998 Prentice Hall PTR. 1998 (part 3 of 3).
Gregory Pfister, "Aspects of the InfiniBand Architecture", IBM Server Technology & Architecture, Austin, TX, Oct. 11, 2001.
Healy et al. Single System Image: A Survey. Article in Journal of Parallel and Distributed Computing. Feb. 2016.
History of IBM Mainframe Operating Systems. From Wikipedia, the free encyclopedia. https://web.archive.org/web/20120622012058/https://en.wikipedia.org/wiki/History_of_IBM_mainframe_operating_systems. Jun. 22, 2012.
Holley et al., "VM/370 asymmetric multiprocessing", IBM Systems Journal, vol. 18, No. 1, 1979.
Hu et al. The Memory and Communication Subsystem of Virtual Machines for Cluster Computing. Jan. 2002.

(56) References Cited

OTHER PUBLICATIONS

Hudzia et al., "Memory Aggregation for KVM", Hecatonchire Project, Nov. 2012.
Hwang et al. Distributed and Cloud Computing From Parallel Processing to the Internet of Things. Oct. 17, 2011.
Ion Stoica. Virtual Machines Disco and Xen (Lecture 10, cs262a). UC Berkeley, Sep. 28, 2016.
J. F. Keeley. An Application-Oriented Multiprocessing System: I Introduction. IBM Systems Journal, vol. 6, No. 2. 1967, part 1.
Janjua et al. CEJVM: "Cluster Enabled Java Virtual Machine". Faculty of Computer Science & Engineering, GIK Institute, Topi, Pakistan. IEEE, Sep. 2002.
Jeff Dike. User Mode Linux. Bruce Peren's Open Source Series. Chapter 12. Copyright © 2006 Pearson Education, Inc. Apr. 2006.
Jeff Dike. UML Clustering. Sep. 14, 2001.
Jiang et al., "SODA: a Service-On-Demand Architecture for Application Service Hosting Utility Platforms", Proceedings of the 12th IEEE International Symposium on High Performance Distributed Computing (HPDC'03), 2003.
Jim Elliot. IBM Mainframes—45+ Years of Evolution. © 2010 IBM Corporation. 2010.
Juhász et al., "Distributed and Parallel Systems: Cluster and Grid Computing", the Kluwer iternational series in engineering and computer science, 2005.
Kai Hwang. Advanced Computer Architecture: Parallelism, Scalability, Programmability. Chapter 7. Copyright © 1993 McGraw-Hill, Inc.
Kaneda et al. A Virtual Machine Monitor for Providing a Single System Image. 2006.
King et al., "Operating System Support for Virtual Machines", Proceedings of the 2003 USENIX Technical Conference, 2003.
Konthothanassis et al., "VM-Based Shared Memory on Low-Latency, Remote-Memory-Access Networks", Nov. 1996.
Kronenberg et al., "VAXclusters: A Closely-Coupled Distributed System", ACM Transactions on Computer Systems, vol. 4, No. 2, pp. 130-146, May 1986.
Lenoski et al. The Stanford Dash Multiprocessor. IEEE, Mar. 1992.
Li et al., "Memory Coherence in Shared Virtual Memory Systems", ACM Transactions on Computer Systems, vol. 7, No. 4, pp. 321-359, Nov. 1989.
Li et al., "Memory Coherence in Shared Virtual Memory Systems", Distributed Information Processing, 2014.
Li et al., "Memory Coherence in Shared Virtual Memory Systems", Yale University, 1986.
Liu et al., "Design and Implementation of a Single System Image Operating System for Ad Hoc Networks", Department of Computer Science, Cornell University, Jun. 2005.
Ma et al., "JESSICA: Java-Enable Single-System-Image Computing Architecture", The University of Hong Kong, Oct. 2000.
Maurice Herlihy. Wait-Free Synchronization. ACM Transactions on Programming Languages and Systems, vol. 11, No. 1. pp. 124-149. Jan. 1991.
Michael James Carlton, "Multiple-Bus, Scaleable, Shared-Memory Multiprocessors", University of California at Berkeley, 1995.
Michael T. Alexander, "Organization and features of the Michigan terminal system", Spring Joint Computer Conference, 1972.
Oracle. Oracle Buys Virtual Iron—Adds advanced virtualization management technology to enhance Oracle VM. Jun. 15, 2009.
Osisek et al. ESA/390 Interpretive-Execution Architecture, Foundation for VM/ESA. IBM Systems Journal, vol. 30, No. 1. Feb. 1991.
Ossanna et al. Communications and Input/Output Switching in a Multiplex Computing System. Fall Joint Computer Conference, 1965.
Peng et al. DVMM: a Distributed VMM for Supporting Single System Image on Clusters. The 9th international Conference for Young Computer Scientists. IEEE, 2008.
Pete Keleher, "CVM: The Coherent Virtual Machine", University of Maryland, Aug. 1, 1998.
Pieter J. Muller, "An Environment for Distributed Programming on a Multicomputer", a thesis submitted to the department of computer science of the University of Stellenbosch in partial fulfillment of the requirements for the degree of master of science, Feb. 1994.
Pinkston et al., "InfiniBand: The 'De Facto' Future Standard for System and Local Area Networks or Just a Scalable Replacement for PCI Buses?", Cluster Computing 6, pp. 95-104, 2003.
Popek and Goldberg Virtualization Requirements. From Wikipedia, the free encyclopedia. https://en.wikipedia.org/wiki/Popek_and_Goldberg_virtualization_requirements. Jun. 22, 2012.
Popek et al. Formal Requirements for Virtualizable Third Generation Architectures. Communications of the ACM, vol. 17, No. 7. Jul. 1974.
Popek, Gerald J. et al. "LOCUS—A Network Transparent, High Reliability Distributed System." SOSP (1981).
Protić et al., "A Survey of Distributed Shared Memory Systems", Proceedings of the 28th Annual Hawaii International Conference on System Sciences, 1995.
R. A. MacKinnon, "The changing virtual machine environment: Interfaces to real hardware, virtual hardware, and other virtual machines", 1979.
R. J. Creasy. The Origin of the VM/370 Time-Sharing System. IBM J. Res. Develop. vol. 25, No. 5. Sep. 1981.
Rajkumar Buyya, "PARMON: a portable and scalable monitoring system for clusters", Monash University, 2000.
Ramachandran et al. Scalability Study of the KSR-1—Appeared in Parallel Computing, vol. 22, pp. 739-759. 1996.
Reports Leading to the National High Performance Computing Program: "A Research and Development Strategy for High Performance Computing", Nov. 1987; "The U.S. Supercomputer Industry," Dec. 1987; "The Federal High Performance Computing Program", Sep. 1989; "High Performance Computing and Communication: Investment in American Competitiveness", ("Gartner Report"), Mar. 1991. (part 1 of 3).
Reports Leading to the National High Performance Computing Program: "A Research and Development Strategy for High Performance Computing", Nov. 1987; "The U.S. Supercomputer Industry," Dec. 1987; "The Federal High Performance Computing Program", Sep. 1989; "High Performance Computing and Communication: Investment in American Competitiveness", ("Gartner Report"), Mar. 1991. (part 2 of 3).
Reports Leading to the National High Performance Computing Program: "A Research and Development Strategy for High Performance Computing", Nov. 1987; "The U.S. Supercomputer Industry," Dec. 1987; "The Federal High Performance Computing Program", Sep. 1989; "High Performance Computing and Communication: Investment in American Competitiveness", ("Gartner Report"), Mar. 1991. (part 3 of 3).
Rich Oehler, "Ideas for a Dependable 'Industry Standard Architecture' Platform", Newisys, Inc., Jan. 27, 2005.
Richard A. Jenkins, "New Approaches in Parallel Computing", Computers in Physics, 1989.
Robert P. Goldberg. Survey of Virtual Machine Research (2). Honeywell Information Systems and Harvard University. Jun. 1974.
Robert P. Goldberg. Survey of Virtual Machine Research. Honeywell Information Systems and Harvard University. Jun. 1974.
Roland et al. Strategic Computing—Darpa and the Quest for Machine Intelligence, 1983-1993. Chapter 5 and Chapter 9. © 2002 Massachusetts Institute of Technology. 2002.
Rudolph et al., "Dynamic Decentralized Cache Schemes for MIMD Parallel Processors", Carnegie-Mellon University, 1984.
Scales et al., "Towards Transparent and Efficient Software Distributed Shared Memory", Oct. 1997.
Scott Lurndal. 3Leaf Virtual Server—Low-Level Architectural Design. May 9, 2018.
Sirer et al al. Distributed Virtual Machines: A System Architecture for Network Computing. Dept. of Computer Science & Engineering, University of Washington. 1998.
Southern et al. FPGA Implementation of High Throughput Circuit for Trial Division by Small Primes. George Mason University. 2007.
Srodawa et al., "An efficient virtual machine implementation", Wayne State University, National Computer Conference, 1973.

(56) References Cited

OTHER PUBLICATIONS

Steier et al. Mind Matters—A Tribute to Allen Newell. Chapter 6. Copyright © 1996 by Lawrence Associates, Inc. 1996.

Tetzlaff et al., "VM/370, Attached Processor, and multiprocessor performance study", IBM Systems Journal, vol. 23, No. 4, 1984.

Tod Newcombe, "Public-Sector Multiprocessing Emerges", Nov. 30, 1995.

USENIX Association. Proceedings of the 5th Annual Linux Showcase & Conference. Oakland, CA. Nov. 5-10, 2001.

Vasilevsky et al., "LINUX Virtualization on Virtual Iron VFe", Virtual Iron Software, Inc., 2005.

VM (operating system). From Wikipedia, The fee encyclopedia. https://en.wikipedia.org/wiki/VM_(operating_system). Jun. 22, 2012.

Walker et al. The LOCUS Distributed Operating System. ACM, 1983.

Walker et al. The LOCUS Distributed Operating System. Presentation, 1983.

Walker, Bruce J. and Douglas Steel. "Implementing a Full Single System Image UnixWare Cluster: Middleware vs Underware." PDPTA (1999).

Wang et al. NEX: Virtual Machine Monitor Level Single System Support in Xen. 2009 First International Workshop on Education Technology and Computer Science. IEEE, 2009.

Whitaker et al. Scale and Performance in the Denali Isolation Kernel. USENIX Association 5th Symposium on Operating Systems Design and Implementation. Dec. 2002.

Woodbury et al., "Shared Memory Multiprocessors: The Right Approach to Parallel Processing", Encore Computer Corporation, IEEE, 1989.

Yeo C.S., Buyya R., Pourreza H., Eskicioglu R., Graham P., Sommers F. (2006) Cluster Computing: High-Performance, High-Availability, and High-roughput Processing on a Network of Computers. In: Zomaya A.Y. (eds) Handbook of Nature-Inspired and Innovative Computing. Springer, Boston, MA. 2006.

Younge et al. Evaluation of SMP Shared Memory Machines for Use With In-Memory and OpenMP Big Data Applications. 2016 IEEE International Parallel and Distributed Processing Symposium Workshops. 2016.

Zhu et al., "JESSICA2: A Distributed Java Virtual Machine with Transparent Thread Migration Support", The University of Hong Kong, 2002.

* cited by examiner

INITIAL (Time 0) MEMORY ASSIGNMENT

| BLOCK | | Current Owner | Last Owner |
|---|---|---|---|
| 0 | — FFFF | Node 0 | Node 0 |
| 10000 | — 1FFFF | Node 0 | Node 0 |
| 20000 | — 2FFFF | Node 0 | Node 0 |
| 30000 | — 3FFFF | Node 1 | Node 1 |
| 40000 | — 4FFFF | Node 1 | Node 1 |
| 50000 | — 5FFFF | Node 1 | Node 1 |
| 60000 | — 6FFFF | Node 2 | Node 2 |
| 70000 | — 7FFFF | Node 2 | Node 2 |
| 80000 | — 8FFFF | Node 2 | Node 2 |
| ... | | | |

1002

INITIAL (Time 0) PROCESSOR ASSIGNMENT

| O/S Processor | Node | # on Node |
|---|---|---|
| P00 | 0 | 0 |
| P01 | 0 | 1 |
| P02 | 0 | 2 |
| P03 | 0 | 3 |
| P04 | 1 | 0 |
| P05 | 1 | 1 |
| P06 | 1 | 2 |
| P07 | 1 | 3 |
| P08 | 2 | 0 |
| P09 | 2 | 1 |
| P10 | 2 | 2 |
| P11 | 2 | 3 |
| P12 | 3 | 0 |
| ... | | |

Time 1 MEMORY ASSIGNMENT
(Updated)

| BLOCK | | Current Owner | Last Owner |
|---|---|---|---|
| 0 | – FFFF | Node 0 | Node 0 |
| 10000 | – 1FFFF | Node 0 | Node 0 |
| 20000 | – 2FFFF | Node 2 | Node 0 | ⟵ SWAP
| 30000 | – 3FFFF | Node 1 | Node 1 |
| 40000 | – 4FFFF | Node 1 | Node 1 |
| 50000 | – 5FFFF | Node 1 | Node 1 |
| 60000 | – 6FFFF | Node 2 | Node 2 |
| 70000 | – 7FFFF | Node 2 | Node 2 |
| 80000 | – 8FFFF | Node 0 | Node 2 | ⟵ SWAP
| ... | | | |

Time 1 PROCESSOR ASSIGNMENT
(Unchanged)

| O/S Processor | Node | # on Node |
|---|---|---|
| P00 | 0 | 0 |
| P01 | 0 | 1 |
| P02 | 0 | 2 |
| P03 | 0 | 3 |
| P04 | 1 | 0 |
| P05 | 1 | 1 |
| P06 | 1 | 2 |
| P07 | 1 | 3 |
| P08 | 2 | 0 |
| P09 | 2 | 1 |
| P10 | 2 | 2 |
| P11 | 2 | 3 |
| P12 | 3 | 0 |
| ... | | |

FIG. 11

Time 2 MEMORY ASSIGNMENT
(Same as Time 1)

| BLOCK |   | Current Owner | Last Owner |
|---|---|---|---|
| 0 | – FFFF | Node 0 | Node 0 |
| 10000 | – 1FFFF | Node 0 | Node 0 |
| 20000 | – 2FFFF | Node 2 | Node 0 |
| 30000 | – 3FFFF | Node 1 | Node 1 |
| 40000 | – 4FFFF | Node 1 | Node 1 |
| 50000 | – 5FFFF | Node 1 | Node 1 |
| 60000 | – 6FFFF | Node 2 | Node 2 |
| 70000 | – 7FFFF | Node 2 | Node 2 |
| 80000 | – 8FFFF | Node 0 | Node 2 |
| ... |   |   |   |

Time 2 PROCESSOR ASSIGNMENT
(Updated)

| O/S Processor | Node | # on Node |
|---|---|---|
| P00 | 0 | 0 |
| P06 | 0 | 1 |
| P02 | 0 | 2 |
| P03 | 0 | 3 |
| P04 | 1 | 0 |
| P05 | 1 | 1 |
| P01 | 1 | 2 |
| P07 | 1 | 3 |
| P08 | 2 | 0 |
| P09 | 2 | 1 |
| P10 | 2 | 2 |
| P11 | 2 | 3 |
| P12 | 3 | 0 |
| ... |   |   |

SWAP (P06 ↔ P01)

FIG. 12

SAVING AND RESUMING CONTINUATION ON A PHYSICAL PROCESSOR AFTER VIRTUAL PROCESSOR STALLS

CROSS REFERENCE TO OTHER APPLICATIONS

This application is a continuation of co-pending U.S. patent application Ser. No. 14/880,132 entitled RESOURCE REQUEST AND TRANSFER IN A MULTI-NODE DISTRIBUTED SYSTEM filed Oct. 9, 2015, which is incorporated herein by reference for all purposes, which is a continuation of U.S. patent application Ser. No. 13/830,094, now U.S. Pat. No. 9,191,435 entitled SELECTIVE DATA MIGRATION OR REMAPPING OF VIRTUAL PROCESSORS TO PROVIDE REQUIRED DATA ACCESSIBILITY TO PROCESSOR CORES filed Mar. 14, 2013 which is incorporated herein by reference for all purposes, which claims priority to U.S. Provisional Patent Application No. 61/692,648 entitled HIERARCHICAL DYNAMIC SCHEDULING filed Aug. 23, 2012 which is incorporated herein by reference for all purposes.

BACKGROUND OF THE INVENTION

Software applications are increasingly operating on large sets of data and themselves becoming increasingly complex. In some cases, distributed computing systems are used to support such applications (e.g., where a large database system distributes portions of data onto a landscape of different server nodes, and optimizes queries into subqueries that get distributed across that landscape). Unfortunately, significant effort has to be spent managing that distribution both in terms of data placement and data access distribution methods, including the complexities of networking. If the landscape changes, if the data organization changes, or if the workload changes, significant work will be required. More generally, the behavior of complex computing systems changes over time, e.g., with new releases of applications, the addition of new intermediate software layers, new operating system releases, new processor models, and changing structural characteristics of data, increasing amounts of data, and different data access patterns.

BRIEF DESCRIPTION OF THE DRAWINGS

Various embodiments of the invention are disclosed in the following detailed description and the accompanying drawings.

FIG. 10 illustrates an example of an initial memory assignment and processor assignment.

FIG. 11 illustrates an updated view of the memory assignment and an unchanged view of the processor assignment.

FIG. 12 illustrates a memory assignment and an updated view of the processor assignment.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
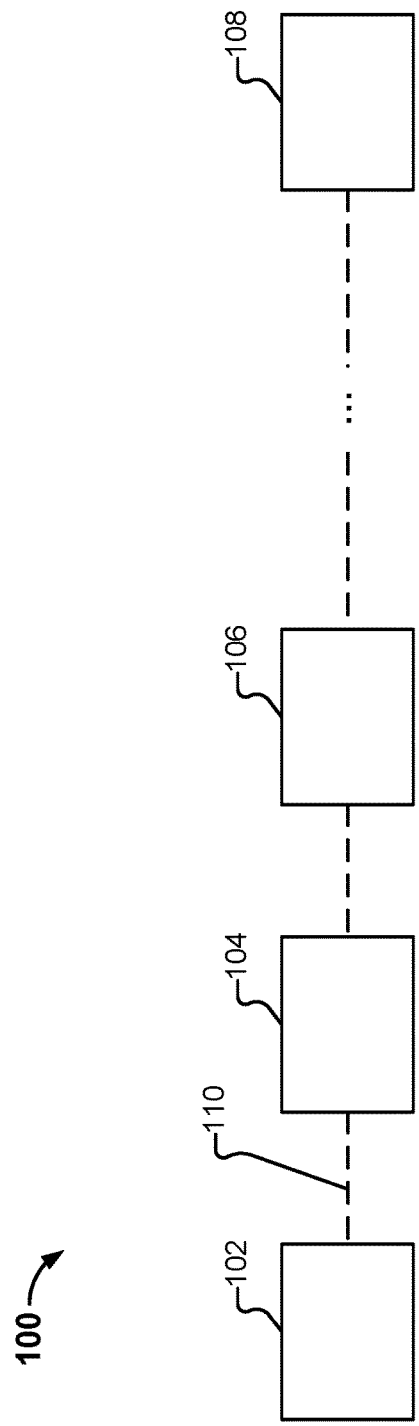
FIG. 1 illustrates an embodiment of a computer system.

FIG. 1 illustrates an embodiment of a computer system. System 100 is also referred to herein as an "enterprise supercomputer" and a "mainframe." In the example shown, system 100 includes a plurality of nodes (e.g., nodes 102-108) located in close proximity (e.g., located within the same rack). In other embodiments, multiple racks of nodes (e.g., located within the same facility) can be used in the system. Further, the techniques described herein can also be used in conjunction with distributed systems.

The nodes are interconnected with a high-speed interconnect (110) such as 10-gigabit Ethernet, direct PCI-to-PCI, and/or InfiniBand. Each node comprises commodity server-class hardware components (e.g., a blade in a rack with its attached or contained peripherals). In the example shown in FIG. 1, each node includes multiple physical processor chips. Each physical processor chip (also referred to as a "socket") includes multiple cores, and each core has multiple hyperthreads.

Figure 2:
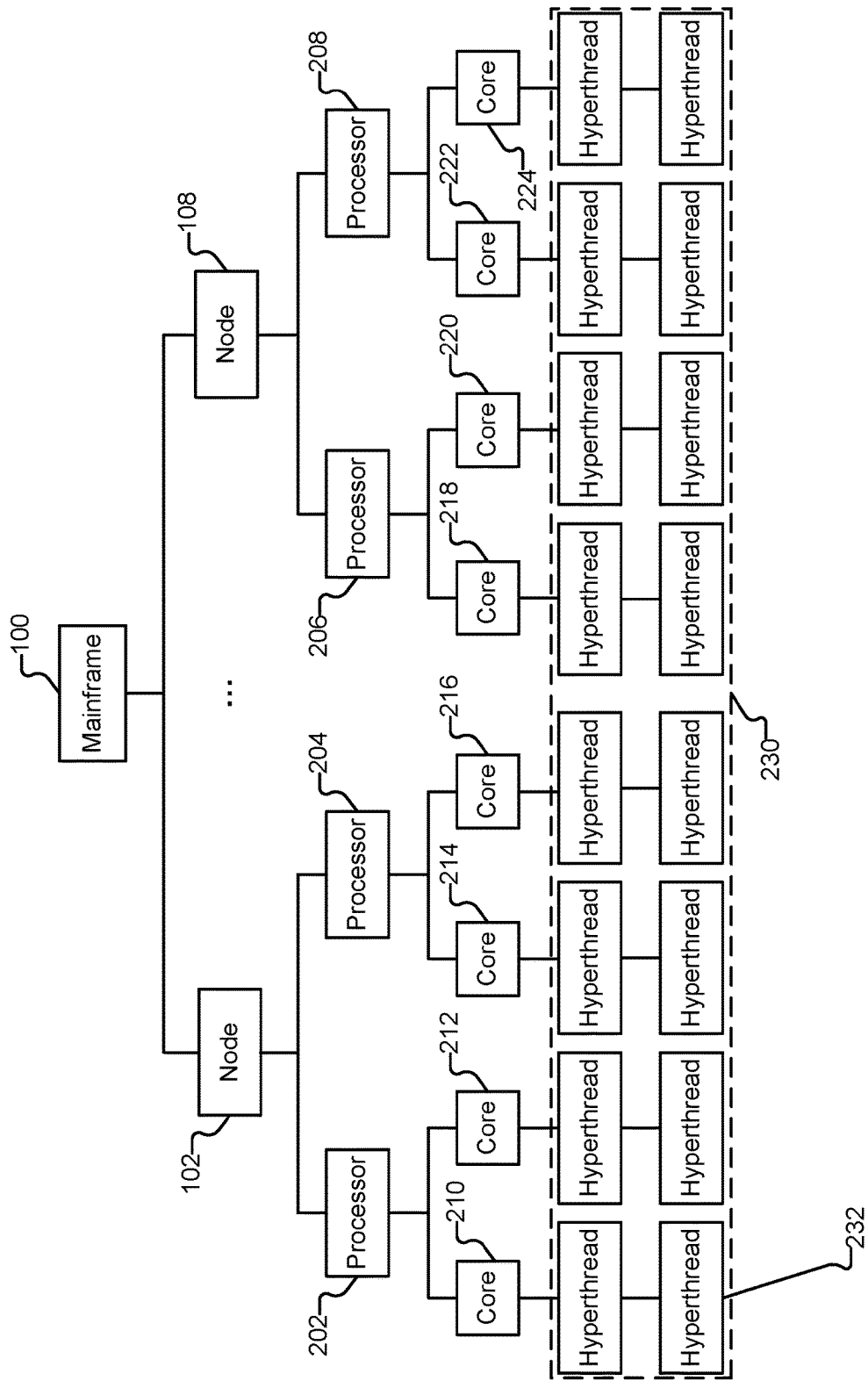
FIG. 2 illustrates the physical structure of the computer system as a hierarchy.

As illustrated in FIG. 2, the physical structure of system 100 forms a hierarchy (from the bottom) of hyperthreads (230), cores (210-224), physical processor chips (202-208), and nodes (102-108 (with nodes 104, 106, etc. omitted from the figure and represented as ellipses)). The tree depicted in FIG. 2 is of a fixed size, defined by the hardware configuration.

As will be described in more detail below, each enterprise supercomputer (e.g., system 100) runs a single instance of an operating system. Both the operating system, and any applications, can be standard commercially available software and can run on system 100. In the examples described herein, the operating system is Linux, however other operating systems can also be used, such as Microsoft Windows, Mac OS X, or FreeBSD.

Figure 3A:
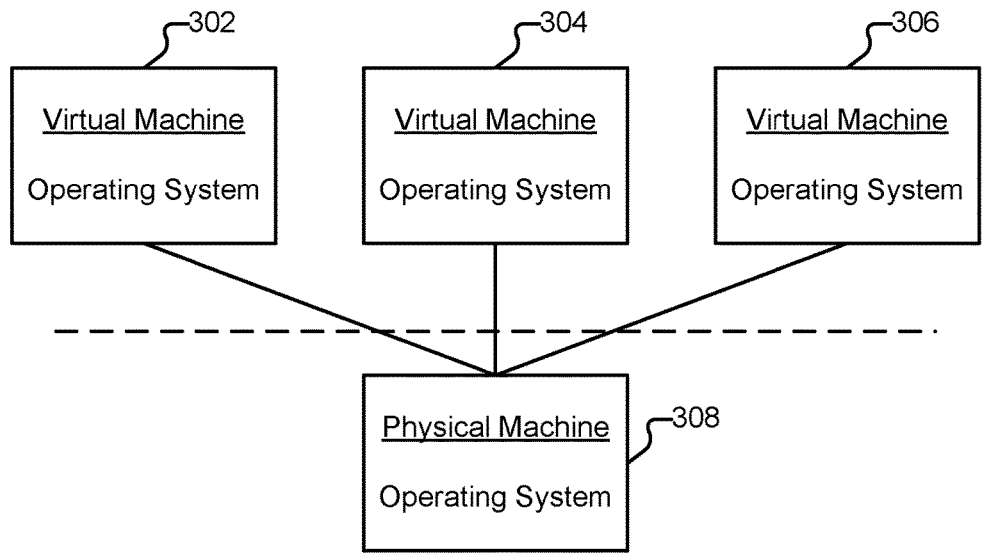
FIG. 3A depicts a virtualized computing environment in which multiple virtual machines (with respective multiple guest operating systems) run on a single physical machine.
Figure 3B:
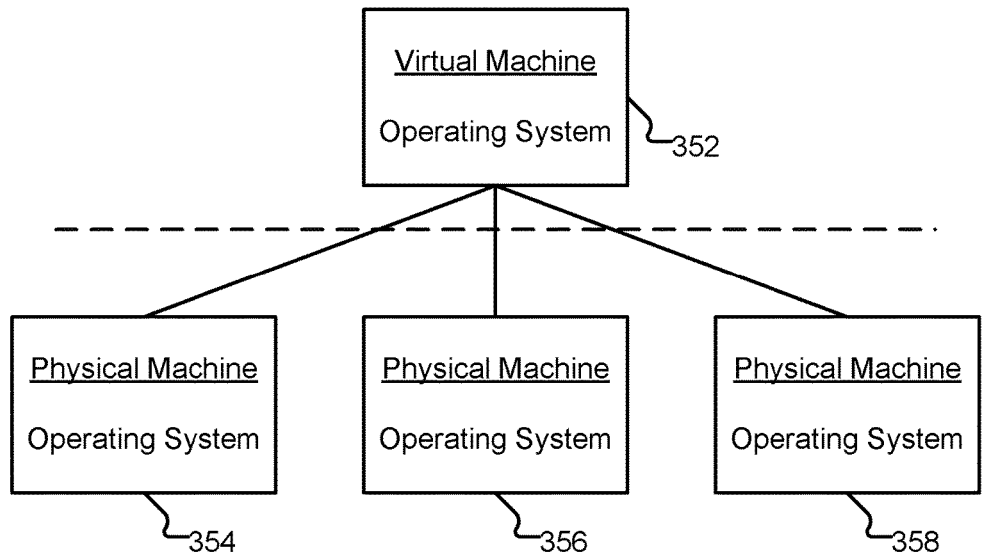
FIG. 3B depicts a virtualized computing environment in which multiple physical machines collectively run a single virtual operating system.

In a traditional virtualized computing environment, multiple virtual machines may run on a single physical machine. This scenario is depicted in FIG. 3A. In particular, three virtual machines (302-306) are running three guest operating systems on a single physical machine (308), which has its own host operating system. In contrast, using the techniques described herein, multiple physical machines (354-358) collectively run a single virtual operating system (352), as depicted in FIG. 3B.

Figure 4A:
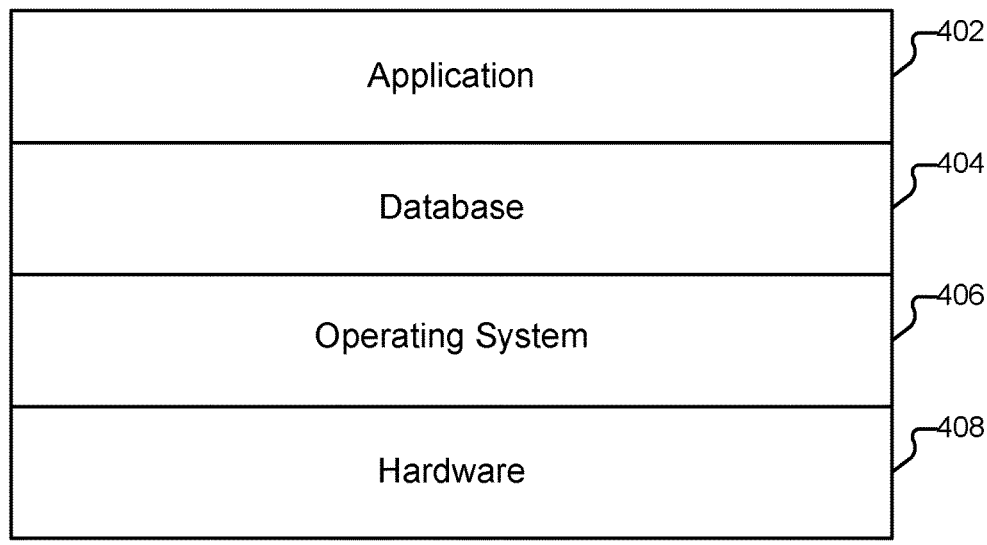
FIG. 4A depicts an example of a software stack.
Figure 4B:
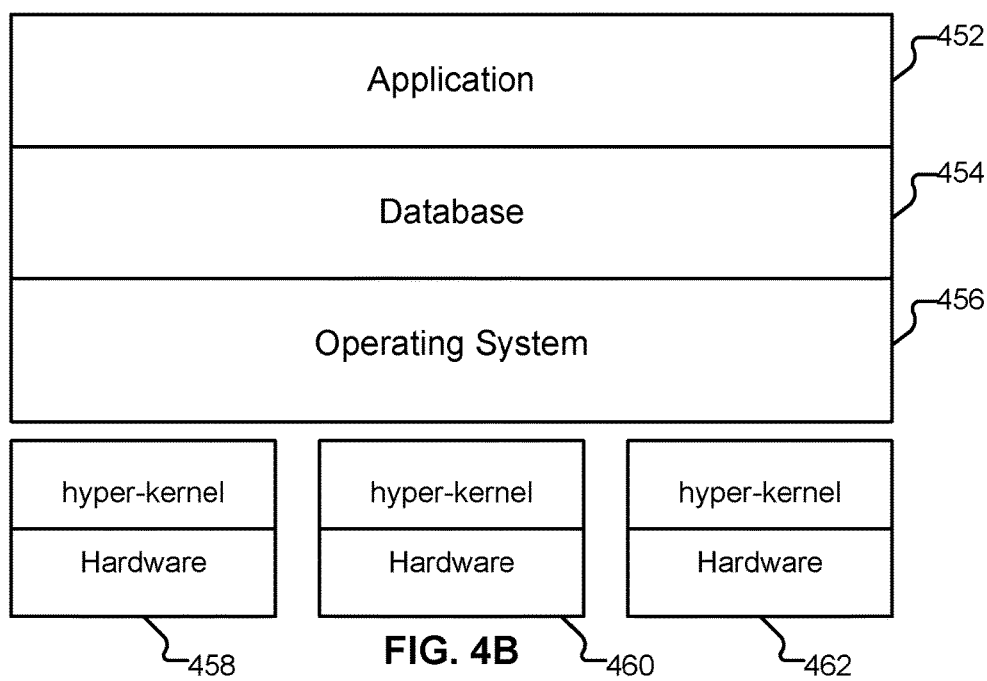
FIG. 4B depicts an example of a software stack.

One example of a software stack is depicted in FIG. 4A. Such a stack may typically be used in traditional computing environments. In the stack shown in FIG. 4A, an application (402) sits above a database engine (404), which in turn sits upon an operating system (406), underneath which lies hardware (408). FIG. 4B depicts a software stack used in some embodiments. As with the stack shown in FIG. 4A, an application (452) sits above a database engine (454), which in turn sits upon an operating system (456). However, underneath the operating system and above the hardware is a layer of software (referred to herein as a hyper-kernel) that observes the system running in real time and optimizes the system resources to match the needs of the system as it operates. The hyper-kernel conceptually unifies the RAM, processors, and I/O (Input Output resources for example Storage, Networking resources) of a set of commodity servers, and presents that unified set to the operating system. Because of this abstraction, the operating system will have the view of a single large computer, containing an aggregated set of processors, memory, and I/O. As will be described in more detail below, the hyper-kernel optimizes use of resources. The hyper-kernel can also help optimize other I/O system resources such as networks and storage. In some embodiments, based on observations and profiles of running software, performance indicators (hints) are provided to upper layers (e.g., database management systems) about the dynamic performance of the system that can further improve overall system performance.

The hyper-kernel can be ported to all major microprocessors, memory, interconnect, persistent storage, and networking architectures. Further, as hardware technology evolves (e.g., with new processors, new memory technology, new interconnects, and so forth), the hyper-kernel can be modified as needed to take advantage of industry evolution.

As shown in FIG. 4B, operating system 456 is running collectively across a series of nodes (458-462), each of which has a hyper-kernel running on server hardware. Specifically, the operating system is running on a virtual environment that is defined by the collection of hyper-kernels. As will be described in more detail below, the view for operating system 456 is that it is running on a single hardware platform that includes all of the hardware resources of the individual nodes 458-462. Thus, if each of the nodes includes 1 TB of RAM, the operating system will have as a view that it is running on a hardware platform that includes 3 TB of RAM. Other resources, such as processing power, and I/O resources can similarly be collectively made available to the operating system's view.

Figure 5:
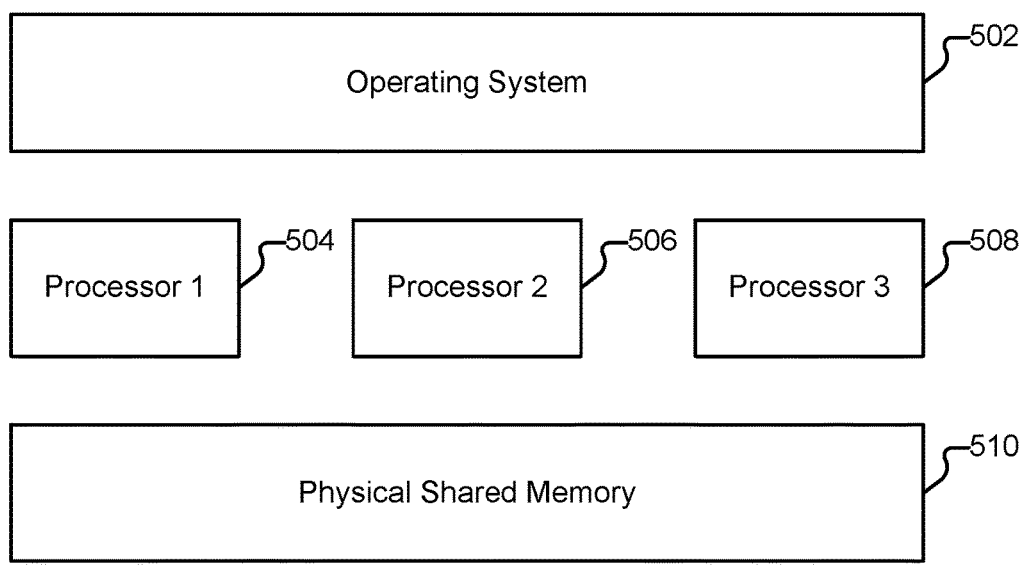
FIG. 5 depicts an example of an operating system's view of hardware on an example system.

FIG. 5 depicts an example of an operating system's view of hardware on an example system. Specifically, operating system (502) runs on top of processors 504-508 and physical shared memory 510. As explained above, an operating system can run on either a traditional computing system or on an enterprise supercomputer such as is shown in FIG. 1. In either case, the view of the operating system will be that it has access to processors 504-508 and physical shared memory 510.

Figure 6A:
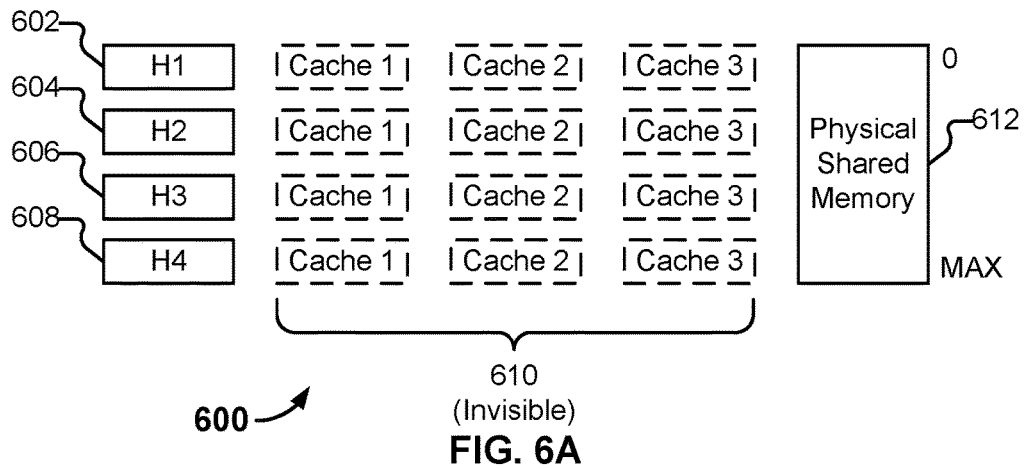
FIG. 6A depicts an example of a hyperthread's view of hardware on a single node.

FIG. 6A depicts an example of a hyperthread's view of hardware on a single node. In this example, a node has four hyperthreads denoted H1 (602) through H4 (608). Each hyperthread can access all portions of physical shared memory 612. Physical shared memory 612 is linear, labeled location 0 through a maximum amount, "max." The node also includes three levels of cache (610).

Figure 6B:
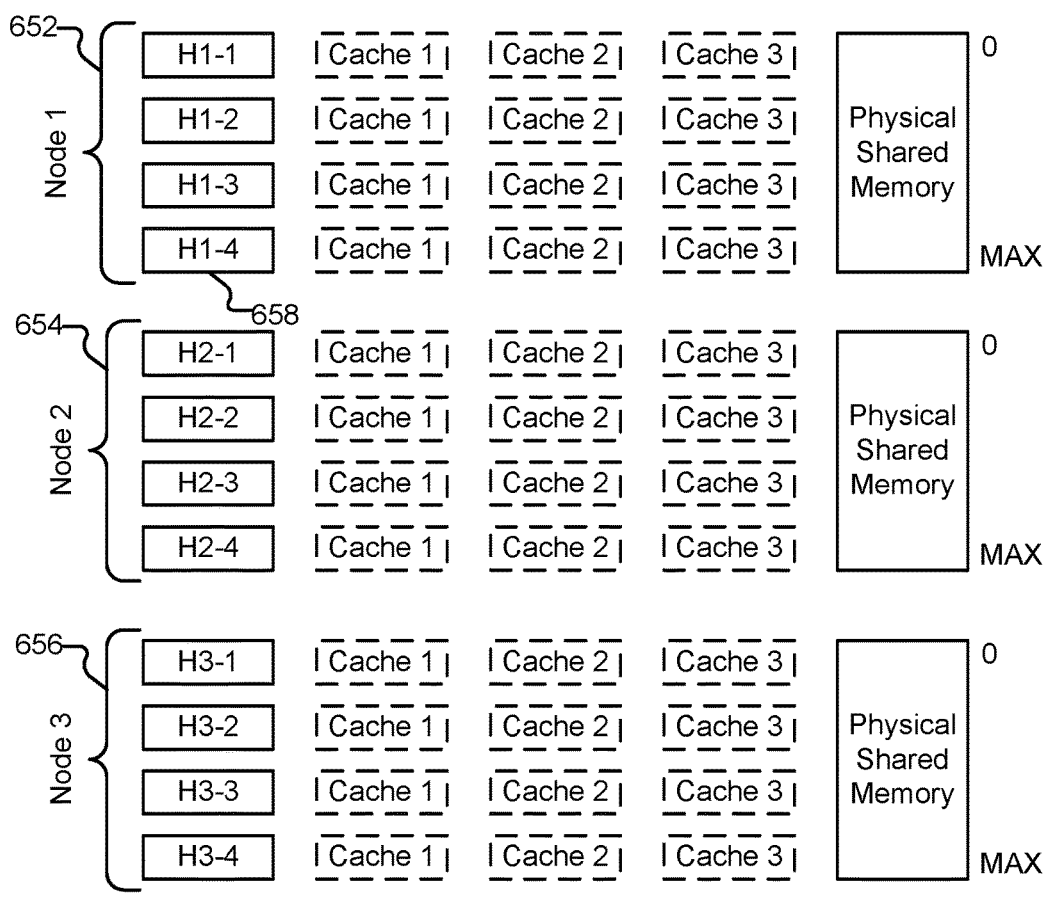
FIG. 6B depicts an example of a hyper-kernel's view of hardware on an example system.

FIG. 6B depicts an example of a hyper-kernel's view of hardware on an example system. In this example, three nodes (652-656) are included in an enterprise supercomputer. Each of the three nodes has four hyperthreads, a physical shared memory, and cache (i.e., each node is an embodiment of node 600 shown in FIG. 6A). A hyperthread on a given node (e.g., node 652) has a view that is the same as that shown in FIG. 6A. However, the hyper-kernel is aware of all of the resources on all of the nodes (i.e., the hyper-kernel sees twelve hyperthreads, and all of the physical shared memory). In the example shown in FIG. 6B, a given hyperthread (e.g., hyperthread 658, "H1-4") is labeled with its node number (e.g., "1") followed by a hyperthread number (e.g., "4").

Figure 7:
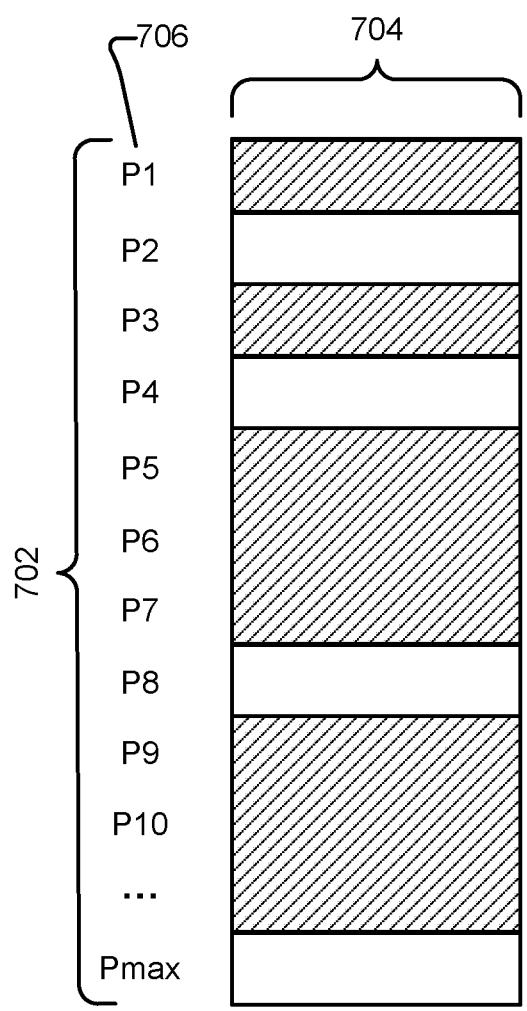
FIG. 7 depicts an example of an operating system's view of hardware on an example of an enterprise supercomputer system.

FIG. 7 depicts an example of an operating system's view of hardware on an example of an enterprise supercomputer system. The operating system sees a plurality of "virtualized processors" denoted in FIG. 7 as P1 through Pmax (702). The virtualized processors correspond to the total number of hyperthreads across all nodes included in the enterprise supercomputer. Thus, using the example of FIG. 6B, if a total of twelve hyperthreads are present across three nodes, a total of twelve virtualized processors would be visible to an operating system running on the enterprise supercomputer. The operating system also sees "virtualized physical memory" (704) that appears to be a large, physical, linear memory of a size equal to the total amount of physical memory across all nodes.

As will be described in more detail below, the hyper-kernel dynamically optimizes the use of cache memory and virtual processor placement based on its observations of the system as it is running. A "virtual processor" is a computing engine known to its guest operating system, i.e., one that has some operating system context or state. As will be described in more detail below, a "shadow processor" is an anonymous virtual processor, i.e., one that had been a virtual processor but has now given up its operating system context and has context known only to the hyper-kernel.

Resource Virtualization

Memory Virtualization

As explained above, in the physical configuration, each node has an array of memory addresses representing locations in memory. As such, in a physical configuration with three nodes (e.g., as depicted in FIG. 6B), there are three memory locations each of which has address 0x123456. In contrast, in the virtual configuration, all memory addresses are unique and represent the sum total of all memory contained in those three nodes. In the virtual configuration, all memory is shared, and all memory caches are coherent. In some embodiments, memory is further subdivided into a series of contiguous blocks, with monotonically increasing memory addresses. In the examples described herein, each page has 4K bytes of memory, however, other subdivisions can also be used, as applicable. The term "blocks" is used herein to describe contiguous arrays of memory locations. In some embodiments, the "blocks" are "pages."

Processor Virtualization

A virtual processor (e.g., virtual processor 706 of FIG. 7), as seen by the operating system, is implemented on a hyperthread in the physical configuration, but can be location independent. Thus, while the operating system thinks it has 500 processors running on a single physical server, in actuality it might have 5 nodes of 100 processors each. (Or, as is shown in FIG. 6B, the operating system will think it has twelve processors running on a single physical server.) The computation running on a virtual processor is described either by the physical configuration on a hyperthread when the computation is running, or in a "continuation," when the virtual processor is not running (i.e., the state of an interrupted or stalled computation).

As used herein, a "continuation" represents the state of a virtual processor. Each continuation:

Has processor state (i.e., saved registers, etc.).
Has a set of performance indicators that guide a scheduler object with information about how to intelligently assign continuations to leaf nodes for execution.
Has a virtual-processor identifier that indicates the processor the operating system thinks is the physical processor to which this continuation is assigned.
Has an event on which this continuation is waiting (possibly empty).
Has a state which includes: "waiting-for-event" or "ready."

I/O Virtualization

I/O systems observe a similar paradigm to processors and memory. Devices have a physical address in the physical configuration and virtual addresses in the virtual configuration. When migrating computations (described in more detail below), if for example, there are memory buffers associated with I/O operations, the I/O devices used will likely perform better if they are co-located with the memory with which they are associated, and can be moved accordingly.

Resource Maps

Resource maps are used to translate between virtual and physical configurations. The following are three types of resource maps used by enterprise supercomputers in various embodiments.

A "physical resource map" is a table that describes the physical resources that are available on each node. It contains, for example, the number and type of the processors on each node, the devices, the memory available and its range of physical addresses, etc. In some embodiments, this table is read-only and is fixed at boot time.

An "initial virtual resource map" is fixed prior to the booting of the operating system and describes the virtual resources that are available from the point of view of the operating system. The configuration is readable by the operating system. In some cases, it may be desirable to configure a system (from the viewpoint of the operating system) that does not match, one-to-one, with the underlying hardware resources. As one example, it may be desirable for the operating system to have more memory and fewer cores. This can be accomplished by changing the ratio of memory to cores, i.e., by modifying the initial virtual resource map.

A "current resource map" is created and maintained by each hyper-kernel instance. This map describes the current mapping between the virtual resource map and the physical resource map from the point of view of each node. For each entry in the virtual resource map, a definition of the physical resources currently assigned to the virtual resources is maintained. Initially (e.g., at boot time), the current resource map is a copy of the initial virtual resource map. The hyper-kernel modifies the current resource map over time as it observes the characteristics of the resource load and dynamically changes the mapping of physical resources to virtual resources (and vice-versa). For example, the definition of the location of the Ethernet controller eth27 in the virtualized machine may at different times refer to different hardware controllers. The current resource map is used by the hyper-kernel to dynamically modify the virtual hardware resource mappings, such as the virtual memory subsystem, as required.

Resource Migration Overview

Using the techniques described herein, virtualized resources can be migrated between physical locations. As explained above, the operating system is provided with information about the virtualized system, but that information need not agree with the physical system.

In the following example, suppose an enterprise supercomputer holds a large in-memory database, larger than can fit into a single node. Part of the database is in a first node, "node1." Suppose one of the cores on a different node, "node2," is trying to access data that is owned by node1 and that does not reside locally in a cache on node2. The core on node2 will receive a memory access violation because it is trying to access data that it believes it should be able to access (but cannot). As will be described in more detail below, the exception is handled in the hyper-kernel.

One way that the situation can be resolved is by moving the needed area of memory to node2, and then returning control back to the operating system (which, in turn, returns it back to the database system). The software can then proceed as intended (i.e., as if the access violation never occurred).

In many cases, there may be one or more other cores in other nodes (e.g., "node3") that are also trying to access the same area block of memory as needed by node2 above. Node3 might be attempting to access the same data, or it might be accessing different data contained in the memory that was moved (also referred to as "false sharing"). The data could be moved to node3, but if the core on node2 asks for the data a second time, the data would need to be moved back to node2 (i.e., potentially moving the data back and forth repeatedly), which can be slow and wasteful. One way to avoid moving data back and forth between cores is to recognize that both cores and the associated block of data should be co-located. Using the techniques described herein, the memory and the computation can be migrated so that they reside on the same node. Doing so will result in a higher likelihood of faster access to data, and a higher probability of sharing data stored in local caches.

When the access violation occurs, an event is triggered (in a system dependent way) to which the hyper-kernel responds. One example of how such an event can be handled is by the invocation of a panic routine. Other approaches can also be used, as applicable. As will be described in more detail below, the hyper-kernel examines the cause of the event and determines an appropriate strategy (e.g., low level transaction) for handling the event. As explained above, one way to handle the event is for one or more blocks of hyper-kernel virtualized memory to be transferred from one node's memory to another node's memory. The transfer would then be initiated and the corresponding resource maps would be updated. A continuation would be built poised to be placed in a local table in shared memory called the event table (discussed below) so that the next thing the continuation does when it is resumed would be to return control to the operating system after the transfer is completed. A decision could also be made to move the virtual processor to the node that contains the memory being requested or to move the virtualized memory (and its virtualized memory address) from one node to another. In various embodiments, the hyper-kernel makes three decisions when handling an event: which (virtual) resources should move, when to move them, and to where (in terms of physical locations) they should move.

TidalTree

The physical hierarchical structure depicted in FIG. 2 has an analogous software hierarchy comprising a set of "scheduler objects" (i.e., data structures), each of which has a set of characteristics described below. The scheduler objects form a "TidalTree," which is an in-memory tree data structure in which each node of the tree is a scheduler object. Each scheduler object corresponds to an element of the physical structure of the supercomputer (but not necessarily vice versa), so there is one node for the entire machine (e.g., node 100 as shown in FIG. 2), one node for each physical node of the system (e.g., node 102 as shown in FIG. 2), one node for each multicore socket on the physical nodes that comprise the entire machine (e.g., node 202 as shown in FIG. 2), one node for each core of each socket (e.g., node 210 as shown in FIG. 2), and one node for each hyperthread on that core (e.g., node 232 as shown in FIG. 2).

Each scheduler object s:

Is associated with a physical component (e.g., rack, blade, socket, core, hyperthread).

Except for the root of the tree, has a parent scheduler object which is partly responsible for directing its operations (as explained in more detail below).

Has a set of children each of which is a scheduler object. This is the null set for a leaf (e.g., hyperthread) node. As explained in more detail below, it is the responsibility of a scheduler object s to manage and assign (or re-assign) work to its children, and indirectly to its grandchildren, etc. (i.e., s manages all nodes in the subtree rooted at s).

Has a work queue, which is a set of continuations (as described earlier).

Has a (possibly empty) set of I/O devices that it also has the responsibility to manage and assign (or re-assign) work.

Each node can potentially be associated with a layer of some form of cache memory. Cache hierarchy follows the hierarchy of the tree in the sense that the higher the scheduler object is, the slower it will usually be for computations to efficiently utilize caches at the corresponding level of hierarchy. The cache of a scheduler object corresponding to a physical node can be a cache of memory corresponding to that node. The memory on the physical node can be thought of as a cache of the memory of the virtual machine.

Resource Migration—Additional Information

The hyper-kernel simulates part of the virtual hardware on which the virtual configuration resides. It is an event-driven architecture, fielding not only translated physical hardware events, but soft events, such as receipt of inter-node hyper-kernel messages generated by hyper-kernel code running on other nodes.

As explained above, when an interrupt event significant to the hyper-kernel occurs, the hyper-kernel makes a decision of how to respond to the interrupt. Before control is returned to the operating system, any higher priority interrupts are recognized and appropriate actions are taken. Also as explained above, the hyper-kernel can make three separate decisions: (1) which resources to migrate upon certain events, (2) when to migrate them, and (3) to where those resources should move.

In the following example, suppose a scheduler object "s" in a virtual machine is in steady state. Each scheduler object corresponding to a physical node has a set of physical processor sockets assigned to it. Hyperthreads in these sockets may or may not be busy. The physical node also has some fixed amount of main memory and a set of I/O devices, including some network devices. Scheduler object s, when corresponding to a node, is also responsible for managing the networks and other I/O devices assigned to nodes in the subtree rooted at s. The following is a description of how resources can migrate upon either synchronous or asynchronous events.

Migrations Triggered by Synchronous Events

In the following example, suppose there exists a leaf node scheduler object s, and virtual processor p assigned to s. Leaf node schedule object s is assumed to be executing an application or operating system code on behalf of an application. Assuming the leaf node is not in an infinite loop, p will eventually run out of work to do (i.e., stall) for some reason (e.g., waiting for completion of an I/O operation, page fault, etc.). Instead of allowing p to actually stall, the hyper-kernel decides whether to move the information about the stalled computation to some other node, making one of that other node's processors "responsible" for the stalled continuation, or to keep the "responsibility" of the stalled computation on the node and instead move the relevant resources to the current node.

The stall is thus handled in either of two ways: either the computation is moved to the physical node that currently has the resource, or else the resource is moved to the physical node that has requested the resource. Example pseudo code for the handling of a stall is provided below (as the "OnStall" routine) in the "EXAMPLE ROUTINES" section below.

Decisions such as how to handle a stall can be dependent on many things, such as the order of arrival of events, the state of the computation running on the virtual machine, the state of the caches, the load on the system or node, and many other things. Decisions are made dynamically, i.e., based on the best information available at any given point in time.

Recording Stalled Computations

Stalled computations are recorded in a data structure referred to as a "continuation." A continuation has a status that can be, for example, "waiting-for-event" or "ready." A stalled computation gets recorded as a newly created continuation with status "waiting-for-event." Once the reason for stalling is satisfied (e.g., due to detection of the event), the status of the corresponding continuation is changed to "ready." Each continuation with status "ready" is stored in a "wait queue" of a scheduler object so that eventually it gets scheduled for execution. In contrast, any continuation with status "waiting-for-event" will not be stored in any scheduler object's wait queue. Instead, it is stored in the local shared memory of the physical node where the hardware event that stalled the corresponding computation is expected to occur, such as receipt of a missing resource.

Additionally, the newly created continuation is associated with the stalling event that caused its creation. This mapping between (stalling) events and continuations awaiting these events permits fast dispatch of asynchronous events (see the "handleEvent" described below). The mapping between continuations and events is stored in a table called "event table" and is kept in the shared memory of the corresponding physical node. Each physical node has its own event table, and an event table of a physical node is directly addressable by every core on that physical node. All anticipated events recorded in an event table of a physical node correspond to hardware events that can occur on that physical node. The scheduler object s mapped to a physical node n represents n, and the event table of n is associated with s. In some cases, several continuations may be waiting on the same event, and so some disambiguation may be required when the event is triggered.

Continuations are built using the "InitContinuation" routine. If a decision is made to move the computation, the remote physical node holding the resource will build a continuation that corresponds to the stalled computation and will store it in the remote physical node's event table. When that continuation resumes, the resource will be available. In effect, the hyper-kernel has transferred the virtual processor to a different node.

In the case where a decision is made to move the resource, the node that has experienced the stall requests the transfer of the resource and builds a continuation using InitContinuation and stores it in the local event table. Upon receipt of the resource, the continuation is attached to an appropriate node in the TidalTree, and when that continuation is resumed, the resource will be generally be available and visible. In effect, the virtual resource has been transferred to the node that requested it.

Note that by placing continuations in event tables, it is guaranteed that the processor that receives the event will quickly find the related continuations in its local event table. The reason for the stall in the computation will have been satisfied.

Having dealt with the stall, the virtual-processor p will in effect be suspended. In between processing the stall and finding a new continuation to resume, p becomes an "anonymous shadow processor," i.e., a processor with no identity known to the operating system. This shadow processor then looks for a new continuation to resume. An example of this is shown below in the "assignProcessor" routine described in more detail below.

Notation

Let e be the event that stalled virtual processor p. Assume that e is triggered by local hardware of some physical node n. In particular, assume r is the resource, which caused the stalling event to occur. Resource r could be a block of memory, or an I/O operation, or a network operation. Assume that p is assigned to scheduler object s, which belongs to the subtree rooted at the scheduler object that represents physical node n.

On-Stall

Pseudo code for an example on-stall routine is provided below in the "EXAMPLE ROUTINES" section. The migration-continuation function returns true if and only if processor p in node n decides that the resource should not move, i.e., the computation should move. This can be determined by a number of factors such as history and frequency of movement of r between nodes, the type of r, the cost of movement, the number of events in n's local event table waiting for r, system load, etc. For example, it may not be desirable to move a resource if there is a continuation stored in n's local event table that is waiting for it.

A variety of patterns of events that would benefit from migrations exist. One approach to describing these patterns of events, like access violations, is in formal language theory. Regular (i.e., Chomsky type-3) languages can be recognized by finite state automata. In addition, using a compact and flexible notation, a description of the events that are observed can be made as sentences (or Chomsky sequences) in the regular language, and the recognition modeled as state transitions in the corresponding finite state automaton. When the full Chomsky sequence of events is seen, migration-continuation gets evaluated accordingly: if the finite state automaton accepts the Chomsky sequence, the condition is met, otherwise, it is not met. The length of the minimized finite state machine defines the amount of history that needs to be kept.

In various embodiments, all events happen locally, and the hyper-kernel on the physical node receiving the event must handle it—truly synchronous events are not assumed to occur between physical nodes. To coordinate migration strategy between nodes, "messages" are used. Message "sends" are synchronous from a node's point of view, but message "receives" are asynchronous, in that a processor or shadow processor, in general, does not wait for receipt of a message. When messages arrive, they are dealt with by the hyper-kernel as a virtual interrupt. In one embodiment, the hyper-kernel will not allow a processor to resume a continuation while there are messages waiting to be handled. Therefore, before control is transferred back to the operating system, the queue is checked, and any messages are dealt with prior to the transfer of control back to the operating system.

For scheduler object s and continuation c, a cost function cost(s,c) can be used to guide the search up the tree. If multiple ancestors of p have non-empty queues, then p may not want to stop its search at the first ancestor found with a nonempty wait queue. Depending on the metrics used in the optimizing strategy, p's choice may not only depend on the distance between p and its chosen ancestor but on other parameters such as length of the wait queues.

A function, find-best-within(s), can be used to return the "best-fit" continuation in a (non-empty) wait queue of a scheduler object. Examples of parameters that can be considered include:

1. Position in the queue
2. The relationship between p and the last location recorded in the continuation (the closer those locations are the better it may be for reusing cache entries).
3. Performance indicators recorded in the continuations in the queue.

The cost and find-best-within functions can be customized as applicable within a given system.

Migrations Triggered by Asynchronous Events

Examples of asynchronous events include: receipt of a packet, completion of an I/O transfer, receipt of a resource, receipt of a message requesting a resource, etc. Generally, a hyper-kernel that receives an event corresponding to a hardware device managed by the operating system needs to deliver a continuation associated with that event to a scheduler object s. By doing so, s will make this continuation available to an appropriate scheduler object and then ultimately to the computation managed by the operating system represented by that continuation. If, on the other hand, the event is the receipt of a message from a hyper-kernel on another physical node, the hyper-kernel can handle it directly.

To simplify explanation, in the examples described herein, an assumption is made that there is only one continuation associated with an event. The procedures described herein can be generalized for the case where multiple continuations are associated with the same event, as needed.

In some embodiments, the search for a scheduler object on which to place the continuation starts at the leaf of the tree that built the continuation and then proceeds upward (if the computation previously executed on this node). By doing so, the likelihood of reusing cache entries is increased.

Handle-Event

Pseudo code for an example handle-event routine is provided below in the "EXAMPLE ROUTINES" section. The cost function, cost(s,c), is a function that helps determine the suitability of assigning c to scheduling object s. The cost function can depend on a variety of parameters such as the size of the wait queues, the node traversal distance between s and the original scheduling node for c (to increase the probability that cache entries will be reused), and the history of the virtual processor, the physical-processor, and the continuation. If the wait queues of the scheduler objects close to s already contain too many continuations, then it may take a relatively longer time until any newly added continuation is scheduled for execution. Example conditions contributing to cost(s,c) are described below, and the conditions can be customized as applicable.

Costs

Cost functions are used to evaluate options when selecting continuations and scheduling objects. Cost functions can be expressed as the summation of a sum of weighted factors:

$$cost = w_1 f_1^{x_1} + w_2 f_2^{x_2} + \ldots + w_n f_n^{x_n},$$

where $w_i$ indicates the importance of the corresponding factor and $x_i$ indicates an exponential.

Examples of factors $f_i$ are listed for each of the costs below. Weights $w_i$ and exponents $x_i$ can be determined in a variety of ways, such as empirically and by simulation. Initial weights and exponents can be tuned to various application needs, and can be adjusted by an administrator to increase performance. The weights can be adjusted while the system is active, and changing weights does not change the semantics of the hyper-kernel, only the operational performance characteristics.

Examples of the factors that can be considered include:

Length of time since the last processor evacuated this scheduler object.

Height of the scheduler object in the TidalTree.

Length of the work queue.

Reservation status (i.e., it may be the case that some application has reserved this resource for a specific reason).

Node specification (i.e., the node itself might have been taken out of service, or is problematic, has in some way a specialized function, etc.).

Age of the continuation in the queue.

Last physical processor to run this continuation.

Last virtual processor to run this continuation.

Node on which this continuation was last executing.

The "temperature" of the cache. (A cache is "warm" when it has entries that are likely to be reused. A cache is "cold" when it is unlikely to have reusable cache entries.)

Group membership of the continuation (i.e., the continuation may be part of a computation group, each element of which has some affinity for other members of the group).

Performance Indicators (Hints) and special requirements.

EXAMPLES

"OnStall" and "assignProcessor"

Figure 8:
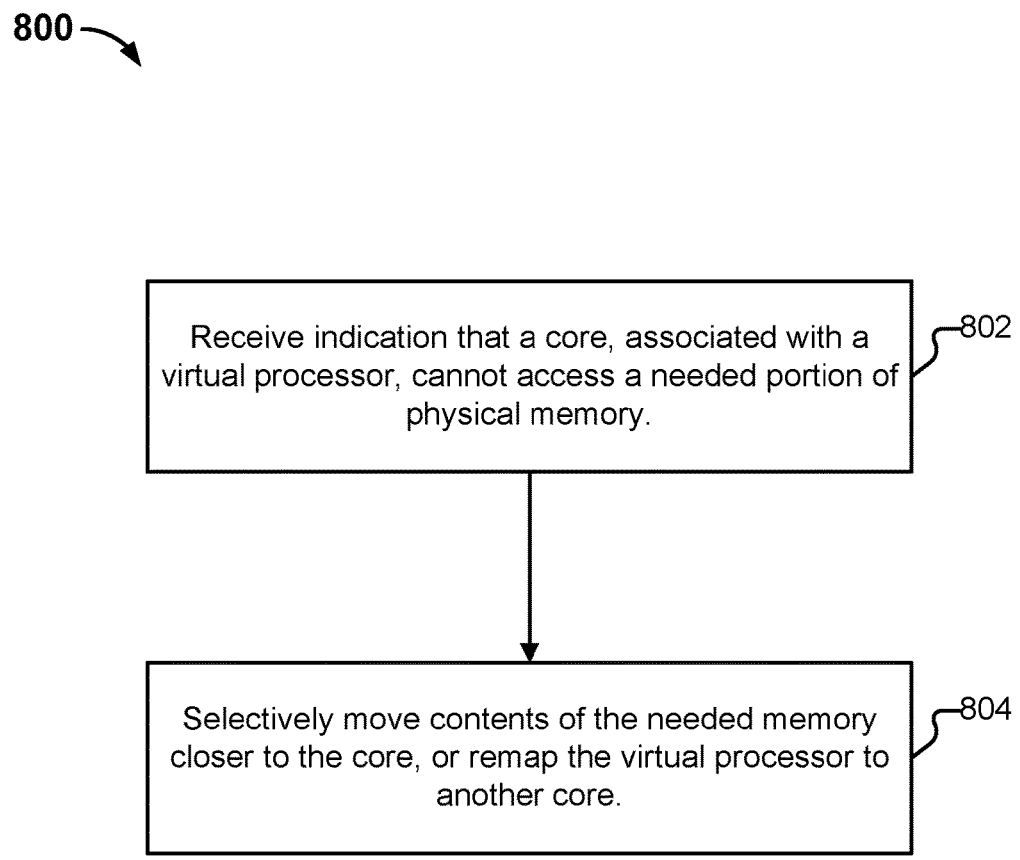
FIG. 8 illustrates an embodiment of a process for selectively migrating resources.

FIG. 8 illustrates an embodiment of a process for selectively migrating resources. In some embodiments, process 800 is performed by a hyper-kernel, such as in conjunction with the OnStall routine. The process begins at 802 when an indication is received that a core (or hyperthread included in a core, depending on whether the processor chip supports hyperthreads) is blocked. As one example, suppose a hyperthread receives a request, directly or indirectly, for a resource that the hyperthread is not able to access (e.g., RAM that is located on a different node than the node which holds the hyperthread). When the hyperthread fails to access the resource (i.e., an access violation occurs), an interrupt occurs, which is intercepted, caught, or otherwise received by the hyper-kernel at 802. In particular, the hyper-kernel receives an indication at 802 that the hyperthread is blocked (because it cannot access a resource that it has been instructed to provide). In addition to reporting its blocked state, the hyperthread provides information such as the memory address it was instructed to access and what type of access was attempted (e.g., read, write, or modify).

At 804, the hyper-kernel determines whether the needed memory should be moved (e.g., to the node on which the blocked hyperthread is located), or whether the requesting process should be remapped (i.e., the virtual processor should be transferred to a different node). The decision can be based on a variety of factors, such as where the needed memory is located, the temperature of the cache, the workload on the node holding the hyperthread, and the workload on the node holding the needed memory (e.g., overworked or underworked). In some embodiments, the workload of a node is determined based at least in part on the average queue length in the TidalTree.

If the hyper-kernel determines that the memory should be moved, the hyper-kernel uses its current resource map to determine which node is likely to hold the needed memory and sends a message to that node, requesting the resource. The hyper-kernel also creates a continuation and places it in its event table. The hyperthread that was blocked at 802 is thus freed to take on other work, and can be assigned to another virtual processor using the assignProcessor routine.

The hyper-kernel checks its message queue on a high-priority basis. When the hyper-kernel receives a message from the node it contacted (i.e., the "first contacted node"), in some embodiments, one of two responses will be received. The response might indicate that the first contacted node has the needed resource (and provide the resource). Alternatively, the message might indicate that the contacted node no longer has the resource (e.g., because the node provided the resource to a different node). In the latter situation, the first contacted node will provide the identity of the node to which it sent the resource (i.e., the "second node"), and the hyper-kernel can send a second message requesting the resource—this time to the second node. In various embodiments, if the second node reports to the hyper-kernel that it too no longer has the resource (e.g., has provided it to a third node), the hyper-kernel may opt to send the continuation to the third node, rather than continuing to request the resource. Other thresholds can be used in determining whether to send the continuation or continuing the resource (e.g., four attempts). Further, a variety of criteria can be used in determining whether to request the resource or send the continuation (e.g., in accordance with a cost function).

In the event the hyper-kernel determines that the continuation should be transferred (i.e., that the computation should be sent to another node rather than receiving the resource locally), the hyper-kernel provides the remote node (i.e., the one with the needed resource) with information that the remote node can use to build a continuation in its own physical address space. If the remote node (i.e., the one receiving the continuation) has all of the resources it needs (i.e., is in possession of the resource that caused the initial access violation), the continuation need not be placed into the remote node's event table, but can instead be placed in its TidalTree. If the remote node needs additional resources to handle the continuation, the received continuation is placed in the remote node's event table.

Figure 9:
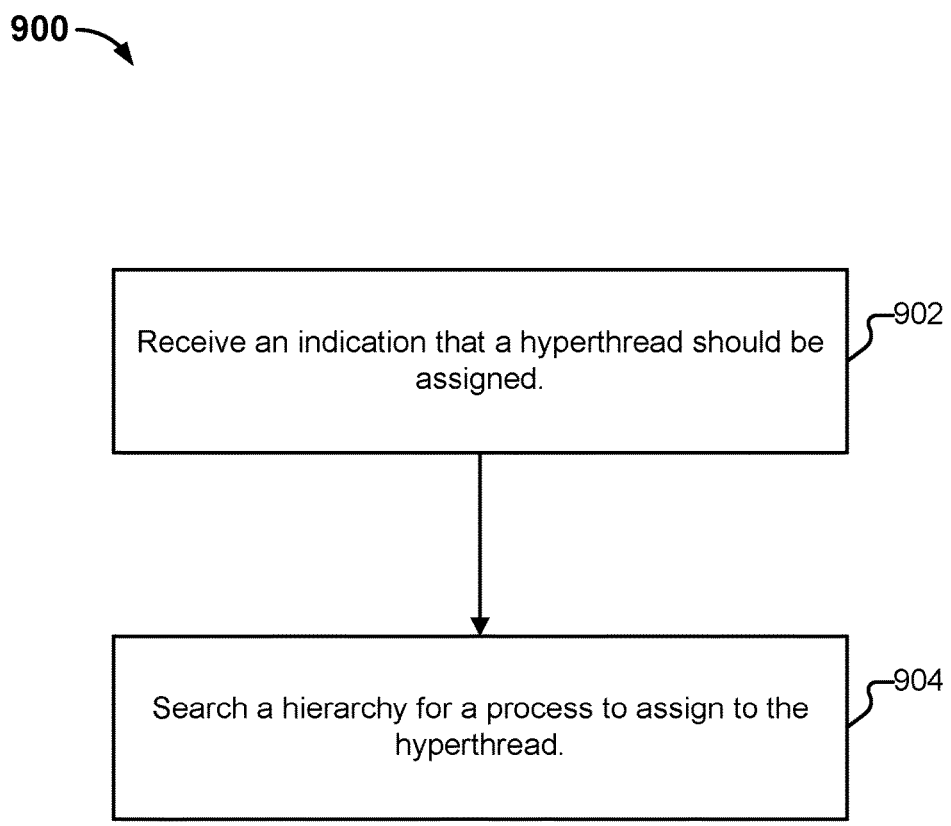
FIG. 9 illustrates an embodiment of a process for performing hierarchical dynamic scheduling.

FIG. 9 illustrates an embodiment of a process for performing hierarchical dynamic scheduling. In some embodiments, process 900 is performed by a hyper-kernel, such as in conjunction with the assignProcessor routine. The process begins at 902 when an indication is received that a hyperthread should be assigned. Process 900 can be invoked in multiple ways. As one example, process 900 can be invoked when a hyperthread is available (i.e., has no current work to do). This can occur, for example, when the hyper-kernel determines (e.g., at 804) that a continuation should be made. The previously blocked hyperthread will become available because it is no longer responsible for handling the computation on which it blocked (i.e., the hyperthread becomes an "anonymous shadow processor"). As a second example, process 900 can be invoked when a message is received (e.g., by the hyper-kernel) that a previously unavailable resource is now available. The hyper-kernel will need to locate a hyperthread to resume the computation that needed the resource. Note that the hyperthread that was originally blocked by the lack of a resource need not be the one that resumes the computation once the resource is received.

At 904, the TidalTree is searched for continuations that are ready to run, and one is selected for the hyperthread to resume. In various embodiments, the TidalTree is searched from the leaf-level, upward, and a cost function is used to determine which continuation to assign to the hyperthread. As one example, when a hyperthread becomes available, the continuation that has been queued for the longest amount of time could be assigned. If no continuations are waiting at the leaf level, or are outside a threshold specified by a cost function, a search will be performed up the TidalTree (e.g., the core level, then the socket level, and then the node level) for an appropriate continuation to assign to the hyperthread. If no appropriate continuations are found for the hyperthread to resume at the node level, the hyper-kernel for that node contacts the root. One typical reason for no continuations to be found at the node level is that there is not enough work for that node to be fully utilized. In some embodiments, the node or a subset of the node can enter an energy conserving state.

Time Sequence

For expository purposes, in the example, a "swapping" operation is used to transfer continuations and memory, but in fact that's not necessary in all embodiments.

FIG. 10 illustrates an example of an initial memory assignment and processor assignment. Specifically, region 1002 of FIG. 10 depicts a hyper-kernel's mapping between physical blocks of memory (on the left hand side) and the current owner of the memory (the center column). The right column shows the previous owner of the memory. As this is the initial memory assignment, the current and last owner columns hold the same values. Region 1004 of FIG. 10 depicts a hyper-kernel's mapping between system virtual processors (on the left hand side) and the physical nodes (center column)/core numbers (right column).

Suppose virtual processor P00 makes a memory request to read location 8FFFF and that the hyper-kernel decides to move one or more memory blocks containing 8FFFF to the same node as P00 (i.e., node 0). Block 8FFFF is located on node 2. Accordingly, the blocks containing 8FFFF are transferred to node 0, and another block is swapped out (if evacuation is required and the block is valid), as shown in FIG. 11.

Next, suppose virtual processor P06 makes a memory request to read location 81FFF. The contents of this block have been moved (as shown in FIG. 11) to node 0. The hyper-kernel may determine that, rather than moving the memory again, the computation should be moved. Accordingly, virtual processor P06 is moved to node 0, and may be swapped with virtual processor P01, as shown in FIG. 12.

Performance Information

Locks and Other Synchronizers

In various embodiments, the use of synchronization mechanisms like locks is minimal. Locks are used, for example, to insert queue and remove queue continuations on scheduler objects and to maintain the event table.

Code Path Lengths

In some embodiments, the (maximum) length of all code paths is determined through a static code analysis, resulting in estimable and bounded amounts of time spent in the hyper-kernel itself. All data structures can be pre-allocated, for example, as indexed arrays. The nodes of the TidalTree are determined at boot time and are invariant, as are the number of steps in their traversal. One variable length computation has to do with the length of the work queues, but even that can be bounded, and a worst-case estimate computed. In other embodiments, other variable length computations are used.

Static Storage

In various embodiments, all data structures needed in the hyper-kernel are static, and determined at boot time, so there is no need for dynamic memory allocation or garbage collection.

Physical Memory

All memory used by the hyper-kernel is physical memory, so no page tables or virtual memory is required for its internal operations (except, e.g., to manage the virtual resources it is managing), further helping the hyper-kernel to co-exist with an operating system.

Sharing Data and Maintaining Consistency

In some cases, e.g., to preserve the conceptual integrity of the virtual machine being presented to the operating system, changes in one node's data structures are coordinated with corresponding ones in a different node. Many of the data structures described herein are "node local," and either will not need to move, or are constant and replicated. The data structures that are node local are visible to and addressable by all hyperthreads on the node. Examples of data structures that are not node local (and thus require coordination) include the current resource map (or portions thereof), the root of the TidalTree, and migratory continuations (i.e., continuations that might have to logically move from one node to another).

A variety of techniques can be used to maintain a sufficient degree of consistency. Some are synchronous and assume all changes are visible at the same time to all nodes (i.e., "immediate consistency"). Others allow a more relaxed solution and strive for "eventual consistency." As mentioned above, physical nodes of an enterprise supercomputer are connected via one or more high speed interconnects. Multiple instances of hyper-kernels are interconnected to pass messages and resources back and forth between physical nodes.

Updating the Current Resource Map

Each physical node n starts off (e.g., at boot time) with the same copy of the physical resource map, the initial virtual resource map, and the current resource map. Each node maintains its own copy of the current resource map.

In some embodiments, each entry for resource r in the current resource map has the following:

1. A local lock, so that multiple hyperthreads on a physical-node cannot modify r at the same time.
2. A node number specifying the node that currently owns the resource.
3. A count k of the number of times n has requested r since the last time it owned r.
4. A boolean which when set signifies that this node n wants r.
5. A boolean which when set signifies that this node has r but is in the process of transferring it, in which case the node number specifies the new owner.

In some embodiments, the count k is used to deal with unbounded chasing of resources. If k exceeds a threshold, a determination is made that it is better to move the newly built continuation rather than chasing the resource around the system.

The following is an example of a mechanism for initiating migration of resources and receiving resources. Key transactions include the following:

1. Node n sends a request for resource r to n'.
2. Node n' receives a request for resource r from n.
3. Node n' may send a "deny" message to n under certain circumstances, otherwise it can "accept" and will send the resource r.
4. Node n will receive a "deny" message from n' if the resource r cannot be sent by n' at this point in time. It may be that r is needed by n', or it may be that r is being transferred somewhere else at the arrival of the request. If the request is denied, it can send a "forwarding" address of the node to which it's transferring the resource. It may be that the forwarding address is n' itself, which is the equivalent of "try again later." When node n receives the deny message, it can resend the request to the node suggested by n', often the new owner of the resource. To avoid n chasing the resource around the system, it can keep track of the number of attempts to get the resource, and switches strategy if the number of attempts exceeds a threshold.
5. Node n will receive the resource r if n' can send the resource. In this case, n needs to schedule the continuation c that was awaiting r, so that c can be resumed.

TidalTree Root

In some embodiments, one physical node of the set of nodes in the system is designated as a "master node." This node has the responsibility at boot time for building the initial virtual resource map and other data structures, replicating them to the other nodes, and booting the operating system (e.g., Linux). The master node can be just like any other node after the system is booted up, with one exception. At least one physical node needs to store the root of the TidalTree. The master node is one example of a place where the root can be placed. Updates to the event queue of the TidalTree root scheduling object are handled in each node by sending a message to the master node to perform the update.

Over time, the hyper-kernel will adapt and locality will continually improve if resource access patterns of the operating system and the application permit.

Continuations

As explained above, physical memory addresses across all nodes are not unique. In some embodiments, the inclusion of physical memory addresses in continuations can be avoided by using partitioned integer indices to designate important data structures in the hyper-kernel. In the event an addresses needs to be put into a continuation, care is taken in the move, since the address is a physical address of the source, and bears no relationship with the physical address in the destination. Moving a continuation means copying its contents to the destination node as discussed above, and remapping any physical addresses from the source to the target.

Timestamps

In some embodiments, access to a free-running counter is visible to all of the nodes. In the absence of this, free-running counters on each node can also be used. Counters in continuations are mapped between the source and destination.

Handling of Disks and Persistent Flash

Where a needed resource is on disk (or persistent flash), in some embodiments, such resources are treated as having a heavier gravitational field than a resource such as RAM. Accordingly, disk/flash resources will tend to not migrate very often. Instead, continuations will more frequently migrate to the physical nodes containing the required persistent storage, or to buffers associated with persistent storage, on a demand basis.

Operating System Configuration

There are many ways to configure an operating system. For servers, an assumption can be made that its operating system is configured to only require a small set of resource types from the virtual machine implemented by the hyper-kernel: storage that includes linear block arrays, networks, processors, memory, and internode interconnects. As a result, the complexity of the operating system installation can be reduced.

Example Data Structures and Functions

The following section provides a list of examples of data structures and functions used in various embodiments.

init-continuation: Initializes a continuation when a computation is stalled.

assignProcessor: Routine that assigns a new continuation to a shadow processor (if possible).

on-stall(r): Stalling event occurs for resource r.

migrate-computation(computational-state,r,n): Message to request migration of a computational state to another node n which you hope has resource r.

on-interrupt(i): Software interrupt i occurs.

handle-event(e): Routine executed when the hyper-kernel is called on to handle an asynchronous event.

request-resource(r,n): Request transfer of resource r from node n.

initiate-send-resource(r,n): Start sending resource r to node n.

on-request-transfer-response(r,n,b): The requested transfer of r from n was accepted or rejected. b is true if rejected.

on-transfer-requested (r,m): Receive a request from m for resource r.

on-resource-transferred(r,n): Ack of resource r has been received from n.

on-receive-resource (r,n): Resource r has been received from n.

migration-continuation(r): True if and only if it is better to migrate a continuation than move a resource.

parent(s): Returns the parent scheduler-object of scheduler object s.

cost(s,c): Used to evaluate placement of continuation c in the wait-queue of scheduler-object s.

find-best-within(s): A cost function that returns a continuation stored in the wait-queue of scheduler-object s.

conserve-energy: Enter low power mode.

resume-continuation(c): Resume the computation represented by c in the processor executing this function at the point.

valid(i): Boolean function that returns true if and only if interrupt i is still valid.

initialize(best-guess): Initializes cost variable best-guess.

insert-queue(s,c): Insert continuation c into the wait-queue of scheduler-object s.

return-from-virtual-interrupt: Resume execution that was temporarily paused due to the interrupt.

r.owner: Returns the node where resource r is local.

r.e: Resource r is awaiting this event.

e.r: This event is for resource r.

e.continuation: When this event occurs, need to resume continuation.

get-state( ): Returns processor's state.

scheduler-object(p): Returns scheduler-object currently associated with processor p.

on-request-transfer-response(r,m, response): Response to request of transferring resource r from node m. Response can be either true if "rejected" or false if "accepted."

Example Routines

The following are pseudo-code examples of routines used in various embodiments. In the following, functions that start with "on-" are asynchronous events or messages coming in.

```
=========================
init-continuation(computational-state)
=========================
/* InitContinuation by processor p awaiting resource r with hints h */
    c = allocate continuation
    c.state = computational-state
    c.last = scheduler-object(p)
    c.state = waiting-for-event
    c.hints = h
    e = allocate event in event-table
    e.resource = r
    e.continuation = c
    return c
end InitContinuation
=========================
assignProcessor
=========================
/* Once processor p in physical node n becomes a shadow processor, it gives up
its O/S identity and starts looking for a continuation with which to resume execution. p will look
for such a continuation in wait-queues as follows: */
    s = scheduler-object (p)
    initialize (best-guess)
    best-s = nil
    /* traverse upwards, keeping track of best candidate */
    /* assume there is a locally cached copy of the root */
    repeat
        guess = cost (s)
        if guess > best-guess
        then
            best-guess = guess
            best-s = s
        s = parent (s)
    until s = nil
    if best-s <> nil
    then
        c = find-best-within (best-s)
        resume-continuation (c)
    else conserve-energy
end assignProcessor
=========================
on-stall(r)
=========================
/* OnStall is invoked when the hardware detects an inconsistency between the
virtual and physical configurations. More specifically, node n requests resource r which the
hardware cannot find on node n. */
    if migration-continuation (r)
    then
        /* send the computation to node n */
        nn = owner(r)
        /* node n believes resource is probably at node nn */
        migrate-computation (r,nn)
    else
        /* request the resource r */
        c = init-continuation(get-state( ))
        /* insert code here to insert c into the local event-table */
        request-resource(r, owner(r))
    assignProcessor            /* At this point, p is an anonymous shadow processor */
```

```
                                        /* p needs to find some work to do */
    end OnStall
==========================
on-migrate-computation(computational-state, r,n)
==========================
        /* the remote node gets the message from n to receive a continuation.
Note: c in this case is the contents of the continuation, not the continuation itself */
    c = InitContinuation /* with the information in the request */
    c.state = computational-state
    e = insert c into the local event-table
    handle-event (e)
    end on-migrate-computation
==========================
on-interrupt(i)
==========================
    /*When a processor p (in subtree of physical node n) is interrupted by i (using a
very low level mechanism specific to the particular hardware design), p does the following: */
    while valid (i)
            e = event-table (i)         /* find the event corresponding to i */
            handle-event (e)
            i = next-queued-interrupt
    end while
    /* resume prior execution */
    return-from-virtual-interrupt
    end on-interrupt
==========================
handle-event(e)
==========================
    /* An event occurred. Move it from the event table to the best scheduler-object. */
    c = e.continuation              /* find the continuation for event e */
    event-table (i).clear = true    /* remove the event from the table */
    e.complete = true               /* mark e as completed */
    c.state = ready
    /* now find out the best place to put c */
    s = c.last
    initialize (best-guess)
    /* look for best choice */
    /* assume there is a locally cached copy of the root */
    repeat
            guess = cost (s,c)
            if guess > best-guess
            then
                    best-guess = guess
                    best-s = s
            s = parent (s)
    until s = nil
    insert-queue (best-s,c)/* queue up c in the wait-queue of best-s */
    end handle-event
==========================
request-resource (r,n)
==========================
    /* When a node n needs a resource r owned by node n' the resource is requested,
but the request may not be satisfied because someone else might have beaten you to request it or
n' is currently using it. */
            current-resource-map(r).wanted = true
            request-transfer(owner(r),r)    /* send a request to the owner of r */
                                            /* requesting r's transfer */
    return
==========================
on-request-transfer-response (r, m, is-rejected)
==========================
    /* Now, consider that you are a node getting a response from a previous request to
a node for a resource r. When the response to this request comes in, it can be accepted or
rejected. */
    if is-rejected
    then /* resource has been transferred to m */
    increment k
    if k > threshold
            then
                                    /* you don't want to go chasing around forever*/
                                    /* trying to get the resource. Give up */
                                    migrate-computation(r,m)
                                    return
            else
                                    request-transfer(r,m) /* try again */
                                    return
    else
            /* request was not rejected and r is the resource */
            r.k = 0
```

-continued

```
            r.wanted = false        /* resource has been moved */
            r.owner = me            /* set the owner to n (i.e., "me") */
            if the resource is memory,
                     update the hardware memory map with the new memory
     return
=========================
on-transfer-requested (r,n)
=========================
/* When a resource request for r comes from node n, if transfer in progress to
owner(r), deny the request */
     if r.being-transferred
     then
            send-request-response (r, owner(r), true)
     else
            /* transfer of resource is accepted */
            r.transferring = true
            initiate-send-resource(r)
            if type(r) = memory
            then update local memory map
            send-request-response (r, owner(r), false)
     return
=========================
on-resource-transferred (r,n)
=========================
/* When an acknowledgement comes in that the transfer is complete */
     r.owner = n
     r.transferring = false
     return
=========================
on-receive-resource(r,n)
=========================
/* Now we receive a message with the requested resource r from n*/
     r.k = 0
     r.wanted = false/* clear the bit saying that it's wanted */
     r.owner = me /* set the owner to n (i.e., "me") */
     if the resource is memory,
            update the memory map with the new memory
     send-resource-transferred(r,n)
     handle-event(r.e)              /* the event we've been waiting for has occurred */
     return
```

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer system, comprising:
 a plurality of physical nodes, wherein an operating system is run collectively across the plurality of physical nodes;
 wherein in response to a virtual processor stalling on an event caused by a requested resource being inaccessible, a continuation comprising a representation of a state of the stalled virtual processor is initialized, and wherein the initialized continuation includes a status with respect to the stalling event, wherein the status includes an indication that the initialized continuation is waiting for the stalling event to be satisfied;
 wherein the initialized continuation is inserted into an event table; and
 wherein a continuation that is ready to run is resumed at least in part by assigning the continuation that is ready to run to a physical processor previously executing the stalled virtual processor, and wherein the physical processor is associated with a physical node in the plurality of physical nodes.

2. The computer system of claim 1 wherein inserting the initialized continuation into the event table includes storing a mapping between the stalling event and the initialized continuation.

3. The computer system of claim 1 wherein, based at least in part on the stalling event being satisfied, the initialized continuation is moved from the event table to a queue of continuations that are ready to run.

4. The computer system of claim 1 wherein control of the continuation assigned to the physical processor is returned to the operating system.

5. The computer system of claim 1 wherein the initialized continuation includes a processor state including a set of saved registers.

6. The computer system of claim 1 wherein the initialized continuation includes a set of performance indicators usable to assign continuations to physical processors for execution.

7. The computer system of claim 1 wherein the initialized continuation includes an identifier associated with the stalled virtual processor.

8. The computer system of claim 1 wherein the initialized continuation includes an indication of the stalling event on which the initialized continuation is waiting.

9. The computer system of claim 1 wherein the event table is associated with a particular physical node in the plurality of physical nodes.

10. The computer system of claim 1 wherein the physical processor comprises a hyperthread.

11. A method, comprising:
 in response to a virtual processor stalling on an event caused by a requested resource being inaccessible, initializing a continuation comprising a representation of a state of the stalled virtual processor, wherein the initialized continuation includes a status with respect to the stalling event, wherein the status includes an indication that the initialized continuation is waiting for the stalling event to be satisfied;

inserting the initialized continuation into an event table; and resuming a continuation that is ready to run at least in part by assigning the continuation that is ready to run to a physical processor previously executing the stalled virtual processor, wherein the physical processor is associated with a physical node in a plurality of physical nodes, and wherein an operating system is run collectively across the plurality of physical nodes.

12. The method of claim 11 wherein inserting the initialized continuation into the event table includes storing a mapping between the stalling event and the initialized continuation.

13. The method of claim 11 wherein, based at least in part on the stalling event being satisfied, the initialized continuation is moved from the event table to a queue of continuations that are ready to run.

14. The method of claim 11 wherein control of the continuation assigned to the physical processor is returned to the operating system.

15. The method of claim 11 wherein the initialized continuation includes a processor state including a set of saved registers.

16. The method of claim 11 wherein the initialized continuation includes a set of performance indicators usable to assign continuations to physical processors for execution.

17. The method of claim 11 wherein the initialized continuation includes an identifier associated with the stalled virtual processor.

18. The method of claim 11 wherein the initialized continuation includes an indication of the stalling event on which the initialized continuation is waiting.

19. The method of claim 11 wherein the event table is associated with a particular physical node in the plurality of physical nodes.

20. The method of claim 11 wherein the physical processor comprises a hyperthread.

21. A computer system, comprising:
a plurality of physical nodes, wherein an operating system is run collectively across the plurality of physical nodes;
wherein in response to a virtual processor stalling on an event caused by a requested resource being inaccessible, a continuation comprising a representation of a state of the stalled virtual processor is initialized, and wherein the initialized continuation includes a set of performance indicators usable to assign continuations to physical processors for execution;
wherein the initialized continuation is inserted into an event table; and
wherein a continuation that is ready to run is resumed at least in part by assigning the continuation that is ready to run to a physical processor previously executing the stalled virtual processor, and wherein the physical processor is associated with a physical node in the plurality of physical nodes.

22. The computer system of claim 21 wherein inserting the initialized continuation into the event table includes storing a mapping between the stalling event and the initialized continuation.

23. The computer system of claim 21 wherein, based at least in part on the stalling event being satisfied, the initialized continuation is moved from the event table to a queue of continuations that are ready to run.

24. The computer system of claim 21 wherein control of the continuation assigned to the physical processor is returned to the operating system.

25. The computer system of claim 21 wherein the initialized continuation includes a status with respect to the stalling event, wherein the status includes an indication that the initialized continuation is waiting for the stalling event to be satisfied.

26. The computer system of claim 21 wherein the initialized continuation includes a processor state including a set of saved registers.

27. The computer system of claim 21 wherein the initialized continuation includes an identifier associated with the stalled virtual processor.

28. The computer system of claim 21 wherein the initialized continuation includes an indication of the stalling event on which the initialized continuation is waiting.

29. The computer system of claim 21 wherein the event table is associated with a particular physical node in the plurality of physical nodes.

30. The computer system of claim 21 wherein the physical processor comprises a hyperthread.

31. A method, comprising:
in response to a virtual processor stalling on an event caused by a requested resource being inaccessible, initializing a continuation comprising a representation of a state of the stalled virtual processor, wherein the initialized continuation includes a set of performance indicators usable to assign continuations to physical processors for execution;
inserting the initialized continuation into an event table; and
resuming a continuation that is ready to run at least in part by assigning the continuation that is ready to run to a physical processor previously executing the stalled virtual processor, wherein the physical processor is associated with a physical node in a plurality of physical nodes, and wherein an operating system is run collectively across the plurality of physical nodes.

32. The method of claim 31 wherein inserting the initialized continuation into the event table includes storing a mapping between the stalling event and the initialized continuation.

33. The method of claim 31 wherein, based at least in part on the stalling event being satisfied, the initialized continuation is moved from the event table to a queue of continuations that are ready to run.

34. The method of claim 31 wherein control of the continuation assigned to the physical processor is returned to the operating system.

35. The method of claim 31 wherein the initialized continuation includes a status with respect to the stalling event, wherein the status includes an indication that the initialized continuation is waiting for the stalling event to be satisfied.

36. The method of claim 31 wherein the initialized continuation includes a processor state including a set of saved registers.

37. The method of claim 31 wherein the initialized continuation includes an identifier associated with the stalled virtual processor.

38. The method of claim 31 wherein the initialized continuation includes an indication of the stalling event on which the initialized continuation is waiting.

39. The method of claim 31 wherein the event table is associated with a particular physical node in the plurality of physical nodes.

40. The method of claim 31 wherein the physical processor comprises a hyperthread.

\* \* \* \* \*

UNITED STATES PATENT AND TRADEMARK OFFICE
CERTIFICATE OF CORRECTION

PATENT NO. : 10,205,772 B2
APPLICATION NO. : 15/429638
DATED : February 12, 2019
INVENTOR(S) : Isaac R. Nassi Page 1 of 1

It is certified that error appears in the above-identified patent and that said Letters Patent is hereby corrected as shown below:

On the Title Page

In Page 2, Item (56), References Cited, U.S. Patent Documents, Column 1, Cite No. 52, Publication No. 2009/0193122, delete "Krishamurthy" and insert --Krishnamurthy--, therefor.

Signed and Sealed this
Eighth Day of October, 2019

Andrei Iancu
*Director of the United States Patent and Trademark Office*